United States Patent [19]
Terada et al.

[11] Patent Number: 6,121,985
[45] Date of Patent: Sep. 19, 2000

[54] VERTICALLY OPENING LASER RECORDING APPARATUS

[75] Inventors: Ichiro Terada, Izumiotsu; Yoshiaki Masuda, Nara; Koichi Matsumoto, Gojo; Tadasu Taniguchi, Uda-gun, all of Japan

[73] Assignee: Sharp Kabushiki Kaisha, Osaka, Japan

[21] Appl. No.: 08/997,591

[22] Filed: Dec. 23, 1997

[30] Foreign Application Priority Data

Dec. 25, 1996 [JP] Japan ..................................... 8-345397

[51] Int. Cl.⁷ ..................................................... G03G 15/04
[52] U.S. Cl. ........................... 347/138; 347/263; 399/118
[58] Field of Search ..................................... 347/138, 152, 347/245, 263; 399/111, 113, 125

[56] References Cited

U.S. PATENT DOCUMENTS 4,873,548  10/1989  Kobayashi et al. ..................... 399/111
5,323,210   6/1994  Inomata ................................... 399/113

FOREIGN PATENT DOCUMENTS

B2 63-56984  11/1980  Japan .
   61-28967    2/1986  Japan .
   1-189665    7/1989  Japan .

*Primary Examiner*—Joan Pendegrass

[57] ABSTRACT

It is an object of the present invention to provide a laser recording apparatus wherein problems such as difficulty in maintenance and effects of shock owing to the laser recording unit of a vertically divided type laser recording apparatus being provided as a single unit, are solved. This laser recording apparatus comprises: a first main unit; a second main unit rotatably supported to the first main unit by a predetermined fulcrum, so as to enable opening and closing; wherein the first main unit is provided with a first unit having optical means, laser beam emitting means, and laser beam detecting means, and wherein the second main unit is provided with a second unit having laser scanning means.

13 Claims, 16 Drawing Sheets

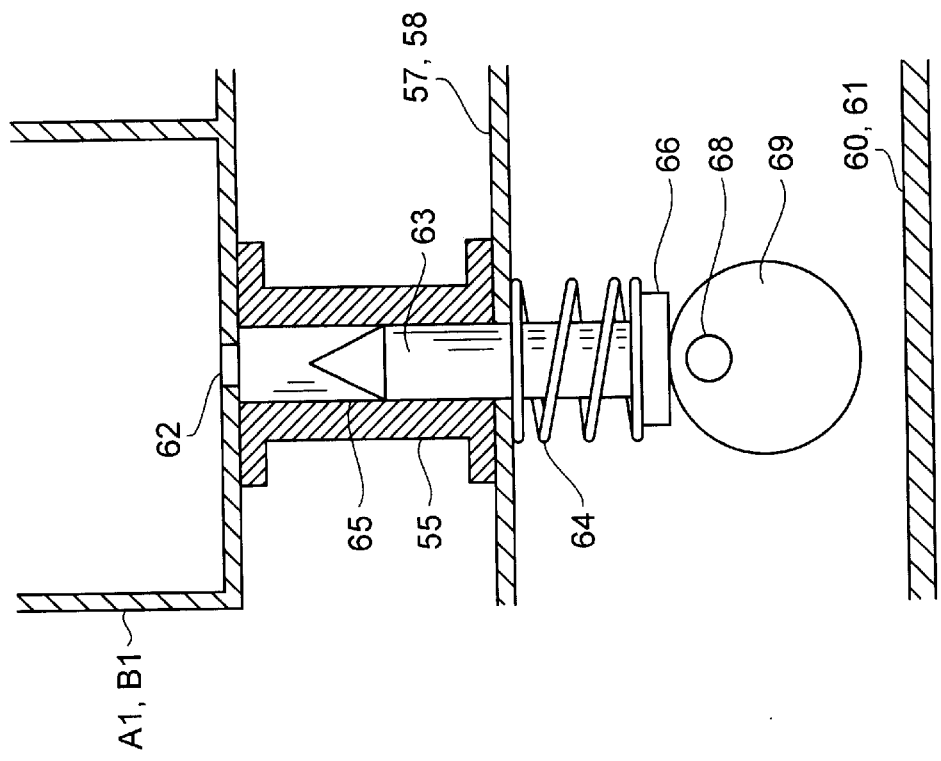
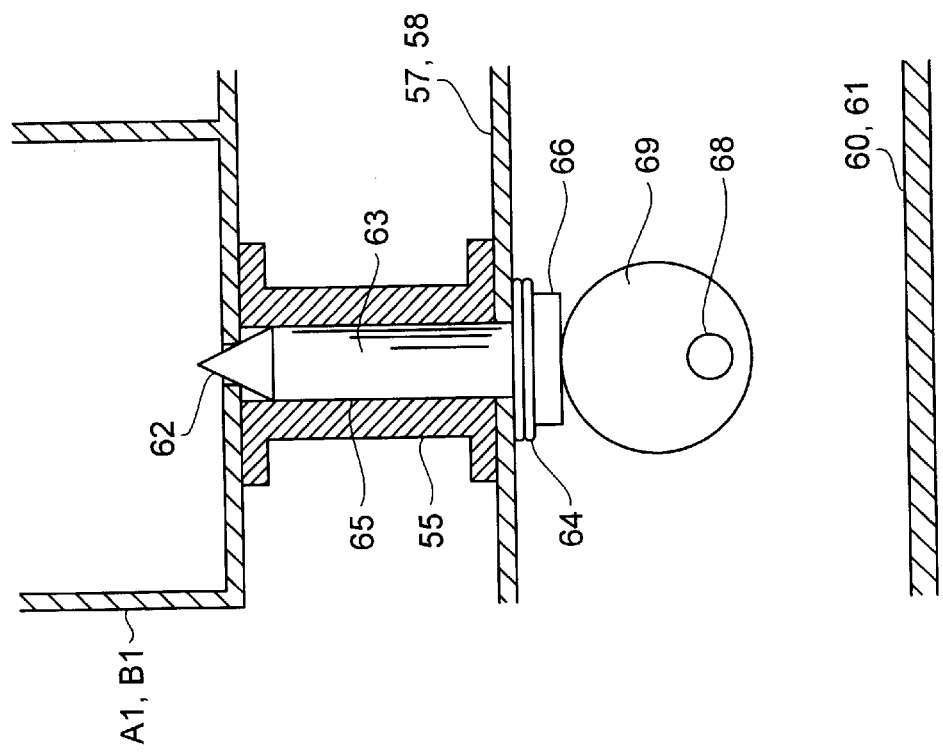

VERTICALLY OPENING LASER RECORDING APPARATUS

BACKGROUND OF THE INVENTION

1. Field of the Invention

The present invention relates to a laser recording apparatus such as a laser beam printer or a digital photocopier capable of opening vertically.

2. Description of the Related Art

FIG. 13 shows a digital photocopier which is a known laser recording apparatus. This digital photocopier is capable of being opened vertically in a clamshell-like manner, and is arranged so as to control a laser beam according to an image signal optically read from an original document, and to scan the controlled laser beam so as to form an image on a photosensitive member 101. The digital photocopier also comprises a scanner unit 102, laser printer unit 103, paper feeding unit 104, and sorter 105.

The scanner unit 102 comprises an original document table 106, reversible automatic document feeder (RADF) 107, and a scannerunit 108. The RADF 107 is provided for setting a plurality of original documents thereupon, of which one document at a time is fed to the scanner unit 108, either one or both sides thereof being read by the scanner unit 108 according to selection by the operator. The scanner unit 108 has a lamp reflector assembly 109 provided with a lamp for illuminating the original document, and a mirror 111 and lens 112 for guiding light reflected from the document to a photoelectric converting device (CCD) 110.

In the case that the RADF 107 is not employed, the scanner unit 102 is arranged so as to move following the bottom surface of the original document table 106 and thus read the original image, and in the case where the RADF 107 is employed, the scanner unit 108 is set in a stationary position below the RADF 107 over which the original document is conveyed, thus facilitating reading of the original document.

The image data obtained by reading the original document with the scanner unit 108 is sent to an image processing unit within a control unit, comprised of a micro-computer and subjected to various processes, and then is temporarily stored in a data recording portion of the image processing unit. The image data within this data recording portion is handed to the laser printer unit 103 according to output instructions, and the image is formed on recording paper.

The laser printer unit 103 comprises a manual-feed original tray 113, laser recording unit 114, and an electrophotography processing unit 115 for forming images. As shown in FIG. 14, the laser recording unit 114 has laser beam irradiating means 116 for irradiating a laser beam modulated by an image signal, laser scanning means 117 for laser scanning the laser beam irradiated from the laser beam irradiating means 116, laser beam detecting means 118 for detecting a portion of the laser beam and manage recording of the image on the photosensitive member 101, and optical means 119 for guiding the laser beam scanned by the laser scanning means 117 onto the photosensitive member 101 thus forming an image thereon. These form one unit, and are contained within a box-shaped unit proper 120.

The laser beam irradiating means 116 comprises a slit semiconductor laser (not shown) for emitting a laser beam according to image data from the data recording unit, a laser oscillation substrate 121, a collimator lens 122 for converging the laser beam in a parallel manner, and a cylindrical lens 124 for correcting planar inclination of the polygon mirror 123. The laser scanning means 117 comprises a polygon mirror 123 which performs isometric speed deviation of the laser beam, and a polygon motor 125 which supports the polygon mirror 123. The optical means 119 comprises f-θ lenses 126a and 126b which perform correction so that the laser beam subjected to isometric speed deviation by the polygon mirror 123 is subjected to isometric speed deviation on the photosensitive member 101, and a mirror 127. The laser beam detecting means 118 comprises a BD mirror 128, BD convergence lens 129, and BD substrate 130, in which a portion of the laser beam is reflected by the BD mirror 128, converged by the BD convergence lens 129, and detected by the BD substrate 130. The existence of the laser beam can be detected from the signals obtained by the BD substrate 130, and this is generally used for knowing detection of the laser starting timing.

With reference to FIG. 13 once more, the electrophotography processing unit 115 follows the form of a known electrophotography method, and comprises a charging unit 131, developing unit 132, transferring unit 133, and charge eliminating unit 134, provided in the proximity of the photosensitive member 101 and in this order in the direction of rotation of the photosensitive member 101, and further comprises a fixing unit 135.

The paper feeding unit 104 is for feeding the paper loaded in the cassette 136 from the very top thereof out to the conveying path 137 so as to be conveyed toward the laser printer unit 103 following the conveying path 137, and comprises a paper feeding roller 138 and conveying roller 139 for conveying paper.

Also, provided downstream in the paper-conveying direction from the fixing unit 135 is a conveying path 140 leading to a sorter 105 and a conveying path 141 leading to the paper feeding unit 104, these being switched between by a reversal gate. The later conveying path 141 branches into a reversal conveying path 142 which is used in the case where both-side copying is performed with the paper feeding unit 104, and a both-side/synthesizing conveying path 143 used for both-side copying and synthesizing copying. Further, the conveying path 137 of the paper feeding unit 104 merges with the both-side/synthesizing conveying path 143 and conveying path from the manual-feed original tray 113 and leads to an image forming position between the photosensitive member 101 and the transferring unit 133.

Accordingly, the image data read from the data reading unit is output from the laser scanning means 117 as a laser beam, and forms an electrostatic latent image on the surface of the photosensitive member 101. This electrostatic latent image is visualized by toner of the developing unit 132, and following this toner image being transferred onto the paper conveyed from the paper feeding unit 104, the toner image is fixed upon the paper by the fixing unit 135. This paper is sent from the fixing unit 135 to the sorter 105 via the convey path 140, or is conveyed to the paper feeding unit 104 via the conveying path 141 where both-side or synthesized copying is performed.

Now, as shown in FIG. 15, this clamshell-type digital photocopier is of a frame structure, comprised of a lower first main unit 150 which is stationary, and an upper second main unit 151 which opens and closes as to the first main unit 150.

Provided to the first main unit 150 are the paper feeding unit 104, sorter 105, and the transferring unit 133, charge eliminating unit 134, and fixing unit 135 of the electrophotography processing unit 115. In the second main unit are provided the scanner unit 2, and the laser printer unit 103 excluding the transferring unit 133, charge eliminating unit 134, and fixing unit 135. The first main unit 150 and second main unit 151 are linked by a fulcrum 152, so that the second main unit 151 is rotatably supported so as to open vertically, the open state being maintained by a damper.

In the side opposite the fulcrum 152 is provided a locking mechanism comprised of a locking piece 153 on the first main unit side and a locking lever 154 on the side of the second main unit side for detachably engaging the locking piece 153, for locking the second main unit 151 to the first main unit 150 when closing the second main unit 151.

With known digital photocopiers, the laser recording unit 114 has been fixed to the second main unit 151 by screws or the like. Accordingly, in the case where the photocopier is moved, or in the case where the photocopier receives external shock or vibrations, the laser recording unit 114 receives the shock or vibrations in full. Also, in the case of opening and closing the second main unit 151 for dealing with trouble such as paper jamming or the like, the laser recording unit 114 receives the shock or vibrations in full.

In the case that the laser recording unit 114 receives shock or vibrations in full in this way, the semiconductor laser, f-θ lenses 126a and 126b, mirrors 123 and 127, and so forth, which comprise the laser recording unit 114, may shift in position, which can cause undesirable effects on the image quality, such as the laser beam irradiation position shifting. Particularly, in the event that such shock or vibrations are applied during inertial rotation of the polygon motor 125 which is a component of the laser recording unit 114 following termination of driving thereof, this can lead to damage to the motor shaft which rotates at high speeds, the bearings, and other members which also are vulnerable to shock or vibration.

Regarding the vertically divided type laser recording apparatus, examples of art for preventing shock and vibrations from effecting the laser recording unit 114 are disclosed in Japanese Examined Patent Publication JP-B2 63-56984 (1988), Japanese Unexamined Patent Publication JP-A 61-28967 (1986), and Japanese Unexamined Patent Publication JP-A 1-189665 (1989).

In order to reduce the shock and vibrations to prevent damages to the bearings and the like of the laser scanning means, the laser recording apparatus disclosed in Japanese Examined Patent Publication JP-B2 63-56984 (1988) is arranged such that disengagement of the locking mechanism is forbidden during recording operation, and in the case where a certain amount of time has passed following termination of supply of driving force to the laser scanning means or where detection has been made that the laser scanning means has either stopped or the rotation thereof has decreased to a certain speed or slower, the disengagement of the locking mechanism is permitted and opening of the main unit is enabled. However, with the above apparatus time is spent before opening the main unit in order to remove jammed paper or the like, which is disadvantageous for effective maintenance. Also, since a mechanism equivalent to the laser recording unit is integrally opened with the processing means comprising the electrophotography processing unit, maintenance work of cleaning and adjusting the mechanism equivalent to the laser recording unit is difficult.

In order to avoid change in scanning line pitch and main scanning speed owing to the vibration and shock, the laser recording apparatus disclosed in Japanese Unexamined Patent Publication JP-A 61-28967 (1986) is arranged such that scanning means including a rotational polygon mirror are provided on the side of the vertically divided casing to which a shaft providing as a fulcrum thereof is provided. In this arrangement as well, a mechanism equivalent to the laser recording unit 114 is integrally opened with a mechanism equivalent to the electrophotography processing unit 115, so maintenance work of the mechanism equivalent to the laser recording unit is difficult.

Further, in order to prevent deterioration of optical precision owing to the vibration and shock, the electrophotography apparatus disclosed in Japanese Unexamined Patent Publication JP-A 1-189665 (1989) is arranged such that an optical system unit is divided into a light scanning unit which scans an optical beam from a light source and a reflecting mirror which irradiates the optical beam from the light scanning unit onto a photosensitive member, and the light scanning unit, photosensitive member, and peripheral members thereof are placed in the stationary lower case, while the upper case openably attached to the lower case being provided with the reflecting mirror. According to this electrophotography apparatus, the photosensitive member and the peripheral members are provided in the lower case, so little space is exposed even with the upper case opened. Thus, removing paper jammed in the convey path, for example, is difficult.

SUMMARY OF THE INVENTION

In order to solve the problems, it is an object of the present invention to provide a vertically divided type laser recording apparatus whose main body is divided into two and in which a vertically divided laser recording unit is provided so that the divided parts thereof are arranged in the divided parts of the laser recording apparatus. That is to say, it is an object of the present invention to provide a laser recording apparatus wherein shock to the laser recording unit can be reduced upon opening or closing of the main body. Also, it is another object of the present invention to provide a laser recording apparatus wherein maintainability is improved.

In a first aspect of the invention, a laser recording apparatus comprises: a stationary first main unit; a second main unit rotatably supported to the first main unit by a predetermined fulcrum, so as to enable opening and closing; and a laser recording unit for scanning a laser beam according to a predetermined image signal and irradiating the laser beam upon a photosensitive member, wherein the laser beam recording unit includes emitting means for emitting a laser beam modulated according to the image signal, scanning means for scanning the laser beam emitted from the emitting means, and optical means for guiding the laser beam scanned by the scanning means onto the photosensitive member and forming an image, and wherein the optical means is provided in the first main unit, and the scanning means is provided in the second main unit.

According to the first aspect of the invention, the laser recording unit of the laser recording apparatus comprised of first and second main units is divided, with one part being positioned in the first main unit and the other part being positioned in the second main unit. Thus, the problems owing to integration of the laser recording unit can be solved, i.e., a large vacant space not occupied by parts can be provided in the state where the second main unit is opened, facilitating processes such as removing jammed paper or the like. Also, providing the members requiring maintenance to the first main unit facilitates ease of maintenance work.

Specifically, the optical means of the laser recording unit is provided in the first main unit, and the scanning means is provided in the second main unit. Thus, the scanning means positioned so as to cover a paper conveying path moves with the second main unit when opened, so a large vacant space not occupied by parts can be provided above the paper conveying path, facilitating dealing with paper jamming. Also, providing the optical means which requires maintenance in the first main unit facilitates a maintenance work such as cleaning or adjustment, owing to the space exposed when opened.

Further, situating components with poor shock-proofing properties in the first main unit makes it harder for these components to be effected by shock, thus protecting these components. Specifically, the scanning means with poor shock-proofing properties is provided in the first main unit and the optical means is provided on the second main unit, so the scanning means does not easily receive effects of shock when opening or closing. Thus, the scanning means is protected.

In a second aspect of the invention, the emitting means is provided in the second main unit.

According to the second aspect of the invention, since the scanning means and emitting means are both provided in the second main unit, they can be configured as a single unit. In this case, adjustment of the optical axis of the laser beam relating to the scanning means and emitting means can be performed beforehand as a unit. Accordingly, in the case where there is the need to replace one of the scanning means and emitting means, the unit containing the means needing replacing can be replaced with a new unit regarding which adjustment of the optical axis has already been performed, thus omitting adjustment of the optical axis at the point of replacing the unit. Accordingly, the scanning means and emitting means can be replaced easily.

In a third aspect of the invention, the recording apparatus further comprises status judging means for judging status whether or not the first and second main units are in such a positional relation that the laser recording unit irradiates the laser beam on a predetermined position on the photosensitive member; and control means for causing the laser recording unit to irradiate the laser beam, in the case where the first and second main units are judged as being in said positional relation by the status judging means, and for causing the laser recording unit to stop, in the case where the first and second main units are judged as not being in said positional relation.

According to the third aspect of the invention, in the case where the first and second main units are in the predetermined positional relation, i.e., in the case where the second main unit is completely closed, the laser recording unit performs irradiation of the laser beam for recording operations, and in the case where the second main unit is not completely closed, irradiation is not performed. Thus, recording operation in the state of the second main unit being in an imperfectly closed state, such as a slight gap existing between the first and second main units, can be prevented beforehand. Consequently, deterioration of image quality formed by the laser recording apparatus owing to the open/closed state of the second main unit can be prevented beforehand.

In a fourth aspect of the invention, the laser recording unit further comprises detecting means for detecting a portion of the laser beam scanned by the scanning means so as to manage image recording on the photosensitive member, and the status judging means judges the positional relation between the first and second main units, based on whether or not the portion of the laser beam is detected by the detecting means.

According to the fourth aspect of the invention, the status judging means judges the open/closed state of the second main unit based on the state of detection of the laser beam of the detecting means provided for management of image recording. Thus, judgment can be made regarding whether or not the second main unit is completely closed, and recording operation in the state of the second main unit being in an imperfectly closed state can be prevented beforehand. Also, the open/closed state of the second main unit is judged with the use of the detecting means provided for management of image recording, so there is no need to provide extra members for judging of the open/closed state, and thus the number of parts can be reduced as compared to an arrangement wherein extra members are provided at this end. Consequently, space can be conserved and costs can be lowered.

In a fifth aspect of the present invention, a laser recording apparatus comprises a stationary first main unit; a second main unit rotatably supported to the first main unit by a predetermined fulcrum, so as to enable opening and closing; and a laser recording unit for scanning a laser beam according to a predetermined image signal and irradiating the laser beam upon a photosensitive member, wherein the laser beam recording unit is divided into first and second units, the first unit being provided in the first main unit and the second unit being provided in the second main unit; and wherein the laser recording apparatus further comprises supporting means for supporting each of the first and second units, and fixing the first and second units to predetermined reference positions, respectively, as to the first and second main units in the case where the laser recording unit performs laser beam irradiation, and not fixing in the case where irradiation is not performed.

According to the fifth aspect of the invention, in the first and second main units of the laser recording apparatus, the first and second units are supported by the supporting means. The supporting means selectively fix the first and second units to the reference position for irradiation of the laser beam in a manner appropriate to the photosensitive member as necessary, as described above. Thus, for example, in the case where positioning is necessary when performing recording operations or when performing maintenance for adjusting image quality, each unit is positioned and fixed to the main unit, so there is no offsetting of the components of the laser recording unit, so that the laser beam is irradiate in an appropriate manner, consequently providing a desirable image. Also, in the case where there being no need for positioning or in the case where recording operation is not performed, for example, in opening or closing, and so forth, each unit is not fixed but is simply supported, so shock from the main unit is not easily transferred thereto. Consequently, the shock received by the laser recording unit can be reduced.

In a sixth aspect of the invention, the supporting means further comprises shock absorbing means for absorbing shock and vibration to the first and second units and supporting the first and second units; and positioning means for positioning and fixing the first and second units to the reference positions in the case where the laser recording unit performs laser beam irradiation, and not fixing the first and second units in the case where the laser beam irradiation is not performed.

According to the sixth aspect of the invention, the supporting means is composed of shock absorbing means and positioning means. In the case where the positioning means does not fix the first unit and second unit, the shock absorbing means absorbs shock and vibration from the first main unit and second main unit to the first and second unit, so vibration and shock received by the laser recording unit can be securely reduced. Also, in the case of fixing the first and second units, in the case where the first and second units are offset the reference position due to vibration or shock, the positioning means returns the first and second units to the reference position and fixes the first and second units thereto. Accordingly, the first and second units are maintained at the reference position after being fixed, so undesirable effects due to offset, vibration, and shock can be securely eliminated.

In a seventh aspect of the invention, the positioning means further comprise flat plate members attached to the first and second units and provided with fitting holes; positioning shafts which are rod-shaped members, having an external diameter grater than the internal diameter of the fitting holes and one end having a round conical shape; and inserting/removing means for inserting the positioning shafts into the fitting holes of the flat plate members in the case where the first and second units are to be positioned and fixed, and removing the positioning shafts from the fitting holes of the flat plate members in the case where fixing is not performed.

According to the seventh aspect of the invention, the positioning means is constructed as described above. The flat plate members are formed integrally with casings of the first and second units, for example. In the case of fixing the first and second units, the positioning shafts are inserted into the fitting holes of the flat plate members. At this point, in the case where the first and second units are offset from the standard position, the one end of the positioning shafts are formed in a round conical shape, so that the inclined plane thereof presses the hole walls in the direction opposite to the direction of offset. Thus, the first and second units are pressed in the opposite direction, so that the positional offset is corrected. Accordingly, positional offset of the first and second units is corrected with an extremely simple positioning mechanism construction, allowing for the first and second units to be securely fixed to the reference position.

In an eighth aspect of the invention, the laser recording unit includes emitting means for emitting a laser beam modulated according to the image signal, scanning means for scanning the laser beam emitted from the emitting means, and optical means for guiding the laser beam scanned by the scanning means onto the photosensitive member and forming an image, wherein the first unit includes the optical means, and the second unit includes the scanning means.

According to the eighth aspect of the invention, the first unit is provided with the optical means, and the second unit is provided with the scanning means. Thus, shock and vibration owing to opening and closing of the second main unit, for example, is not easily transferred to the scanning means and optical means via the supporting means, so both means do not easily receive the effects of shock and vibrations. Also, at the same time, the optical means which requires maintenance is provided in the first main unit, thereby facilitating the maintenance. Further, in the case where the second main unit is opened, the scanning means moves with the second main unit, so that a great amount of space without parts can be provided above the conveying path, and consequently, process of removing jammed paper or the like can be performed with ease. Accordingly, reduction of shock to the laser recording means and improvement in the maintainability thereof can both be realized. Further, in the case where the scanning means and emitting means are both provided in the second unit, a single unit can be constructed for both means, so that replacement of both means is facilitated in a laser recording apparatus which serves to reduce shock to the laser recording unit and improve maintainability.

In a ninth aspect of the invention, the fulcrum is provided in the proximity of the scanning means.

According to the ninth aspect of the invention, the second main unit opens and closes on the fulcrum provided in the proximity of the scanning means. Effects of vibration and shock owing to opening and closing of the second main unit to the scanning means are least with the scanning means being situated at the point closest to the fulcrum. Thus, with the predetermined fulcrum as described here, the vibration and shock to be absorbed by the supporting means during opening and closing of the second main unit is reduced. Accordingly, the effectiveness of shock absorbing for the scanning means is raised, and undesirable effects of vibration and shock to the scanning means can be eliminated.

In a tenth aspect of the invention, the laser recording unit includes emitting means for emitting a laser beam modulated according to the image signal, scanning means for scanning the laser beam emitted from the emitting means, and optical means for guiding the laser beam scanned by the scanning means onto the photosensitive member and forming an image, and wherein the first unit includes the scanning means, and the second unit includes the optical means.

According to the tenth aspect of the invention, the first unit is provided with the scanning means, and the second unit is provided with the optical means. Thus, shock and vibration owing to opening and closing of the second main unit, for example, is not easily transferred to the scanning means and optical means via the supporting means, so both means do not easily received the effects of shock and vibrations. Further, situating the scanning means with poor shock-proofing properties in the first main unit makes it harder to be effected by vibration and shock. Accordingly, the scanning means can be securely protected from vibration and shock. Particularly, in the case where the scanning means includes a shaft which rotates at high speeds and shock or vibrations are applied during inertial rotation thereof, damage to the shaft or the bearings thereof can be prevented, since the vibration and shock are not transferred easily. Further, In the case where the scanning means and emitting means are both provided in the first unit, a single unit can be constructed for both means, so that replacement of both means is facilitated in a laser recording apparatus which serves to reduce shock to the laser recording unit and improve maintainability. Also, providing the fulcrum for the opening and closing of the second main unit in the proximity of the scanning means inhibits transfer of the effects of vibration and shock owing to opening and closing of the second main unit to the scanning means, further protected the scanning means from the effects thereof.

BRIEF DESCRIPTION OF THE DRAWINGS

Other and further objects, features, and advantages of the invention will be more explicit from the following detailed description taken with reference to the drawings wherein:

FIG. 5A is a diagram illustrating a state of positioning and fixing the laser recording unit 14 by the supporting means;

FIG. 5B is a diagram illustrating a state of releasing the positioning and fixing by the supporting means;

DETAILED DESCRIPTION OF THE PREFERRED EMBODIMENTS

Figure 1:
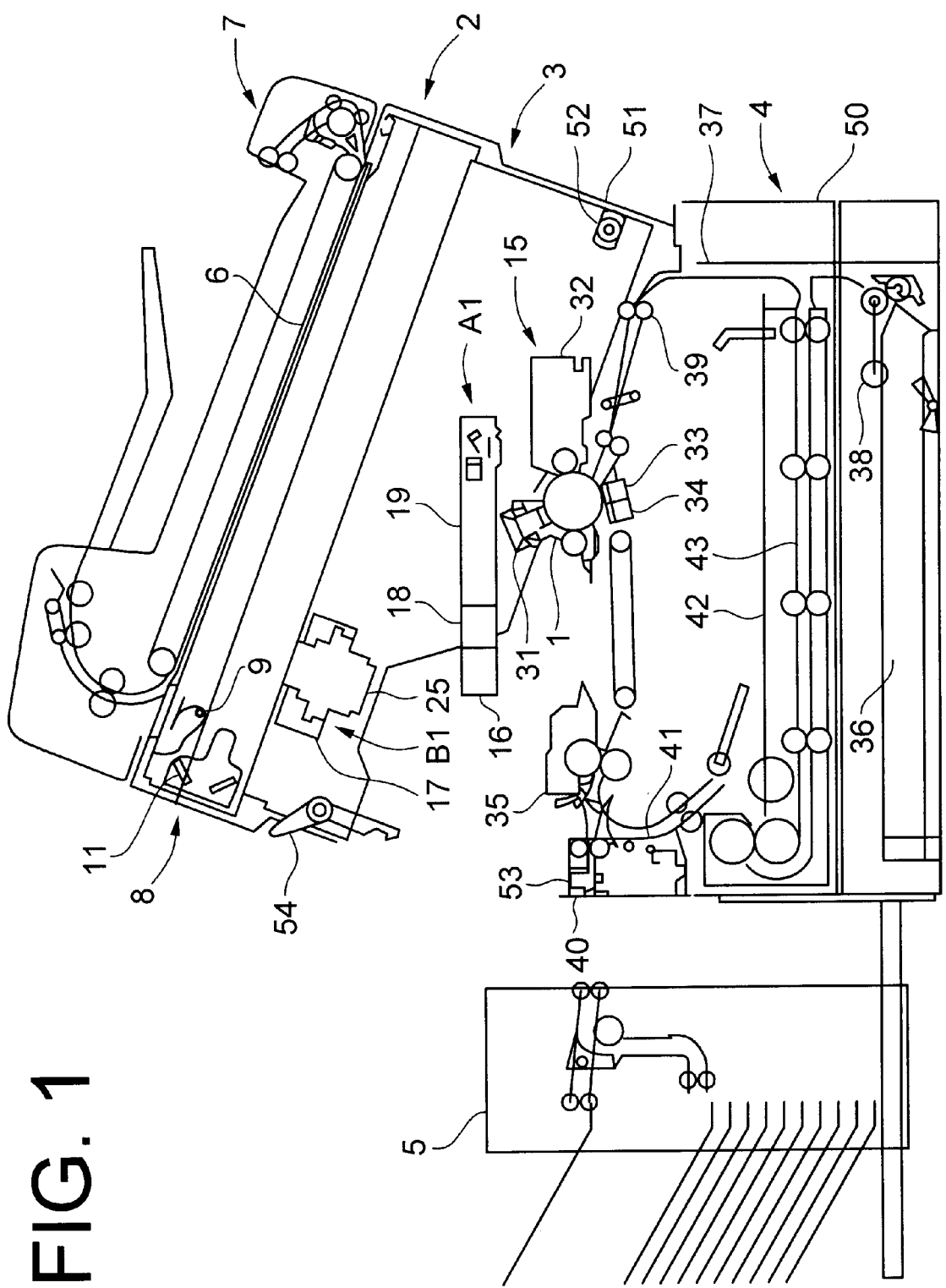
FIG. 1 is a constructional diagram illustrating a laser recording apparatus of a first embodiment in an open state.

Now referring to the drawings, preferred embodiments of the invention are described below.

Figure 13:
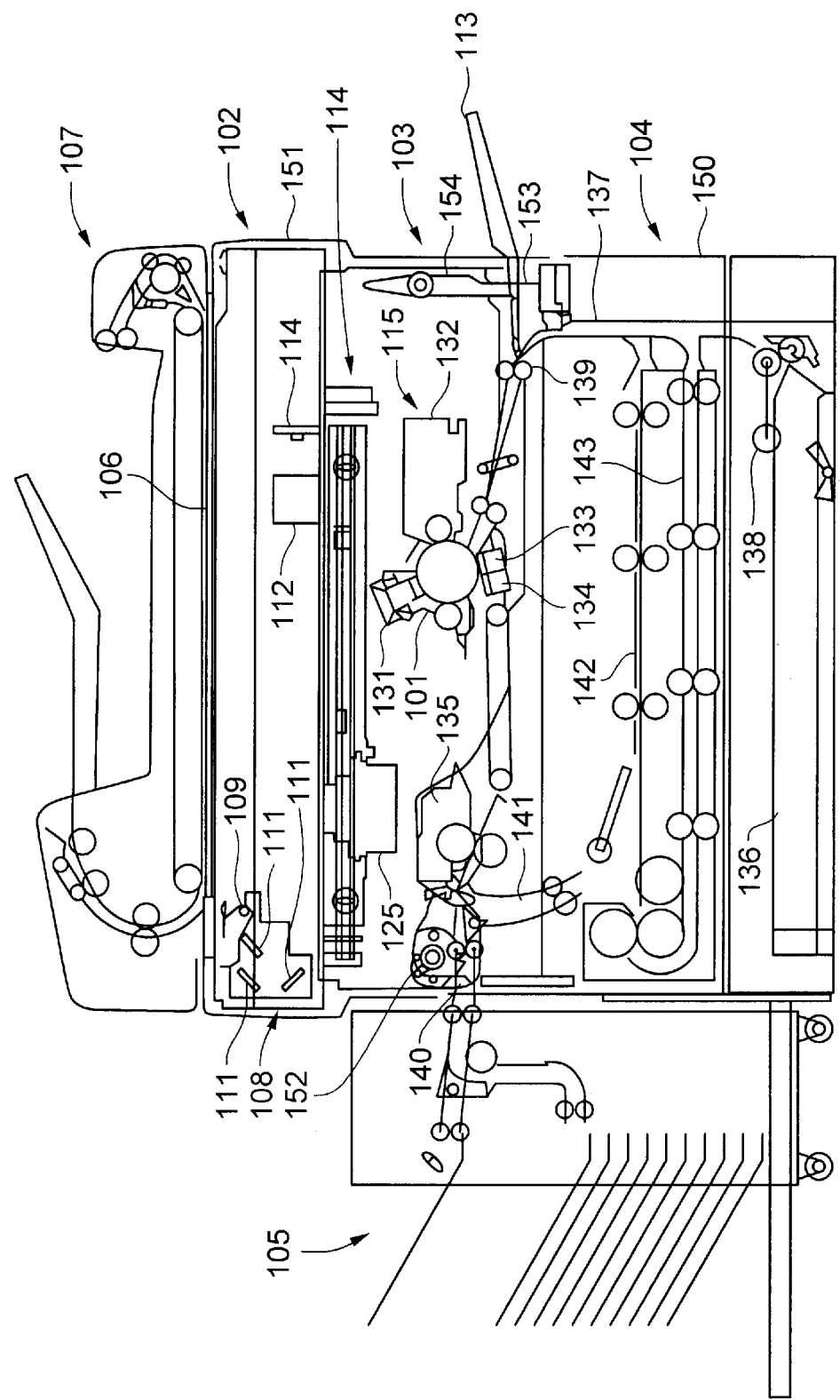
FIG. 13 is a constructional diagram illustrating a prior art laser recording apparatus.
Figure 14:
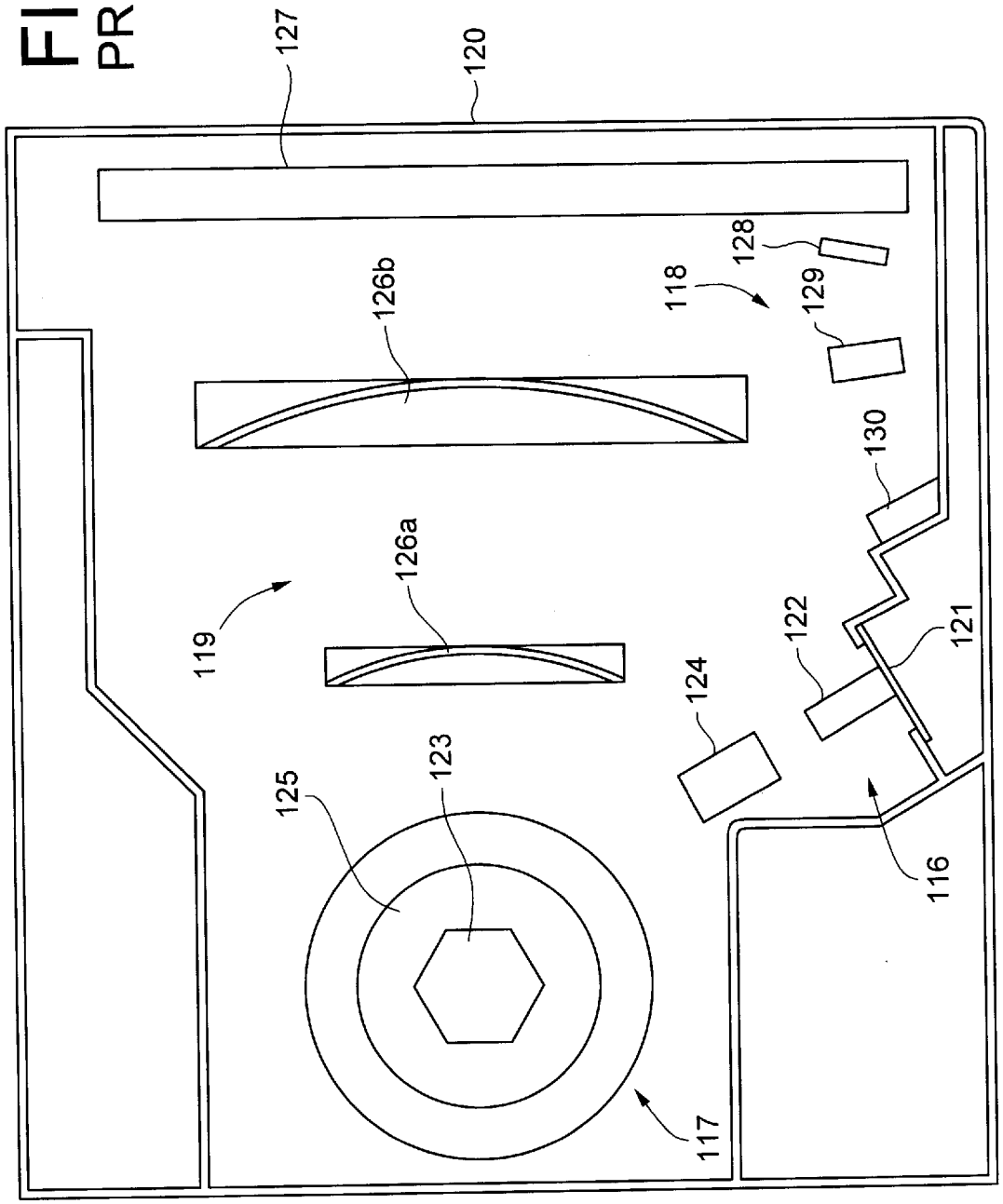
FIG. 14 is a plan view of a laser recording unit 114 of the prior art laser recording apparatus.
Figure 15:
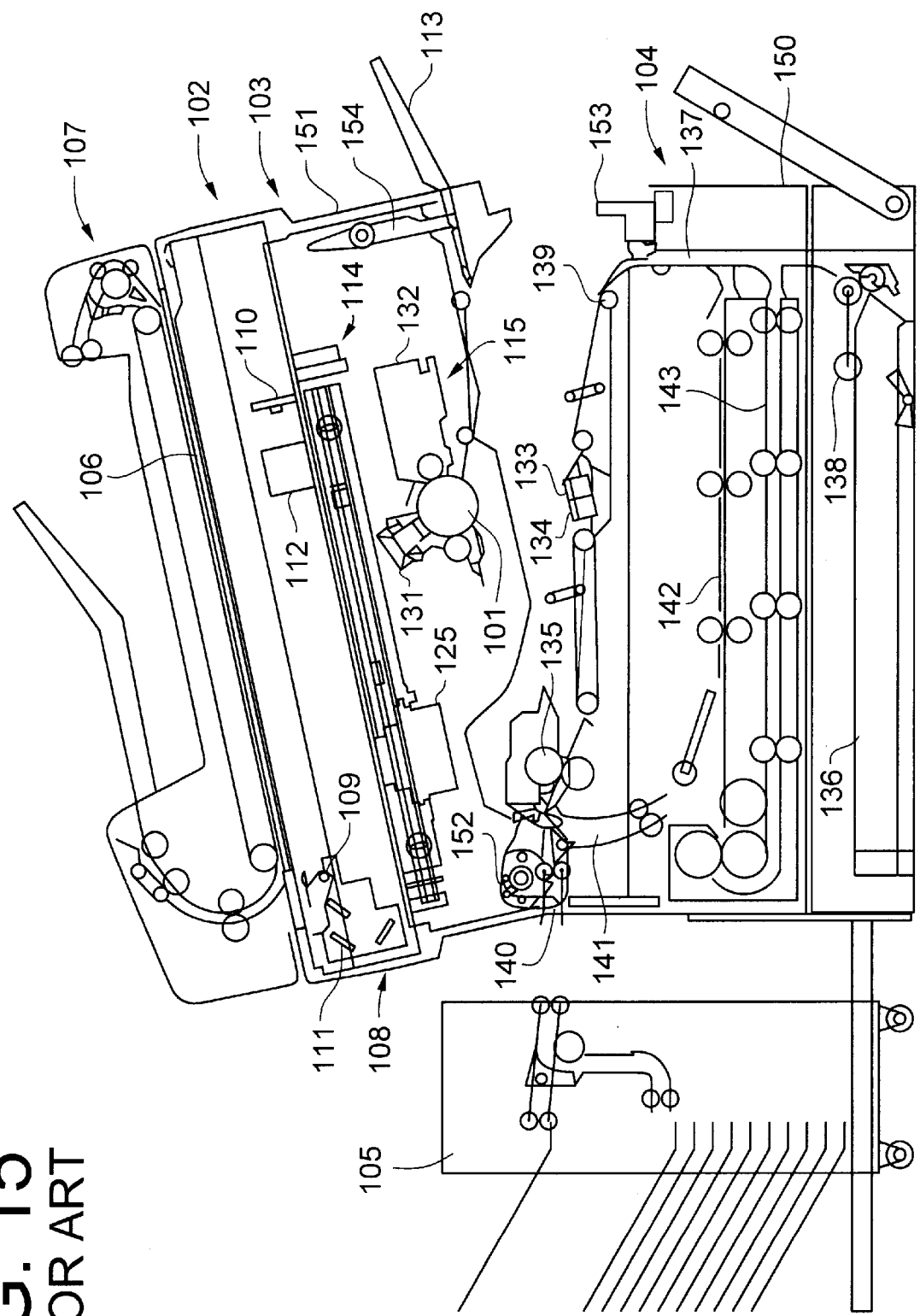
FIG. 15 is a constructional diagram illustrating the prior art recording apparatus in an open state.

FIG. 1 is a cutaway diagram illustrating the construction of a laser recording apparatus of a first embodiment of the present invention, in an open state. The laser recording apparatus is of a vertically divided type, and includes a scanner unit 2 which optically reads original documents and generates an image signal, a laser printer unit 3 which generates images on paper by electrophotography method based on the image signal, a paper feeding unit 4 which feeds paper to the laser printer unit, and a sorter 5 which outputs paper on which images have been formed. The laser printer unit 3 includes a manual feed original document tray (not shown), a laser recording unit 14, and an electrophotography processing unit 15 for forming images. The structure and actions of the members comprising the parts 2 through 5 of the laser recording apparatus according to the first embodiment are the same as those of the known laser recording apparatus described with reference to FIG. 13 with the same names, so these members are denoted by reference numerals smaller by 100, and description thereof will be omitted. Also, the positioning of the parts within the scanner unit 2, paper feeding unit 4, and the electrophotography processing unit 15 are the same as that of the scanner unit 102, paper feeding unit 104, and the electrophotography processing unit 115, so description thereof will be omitted.

Figure 2:
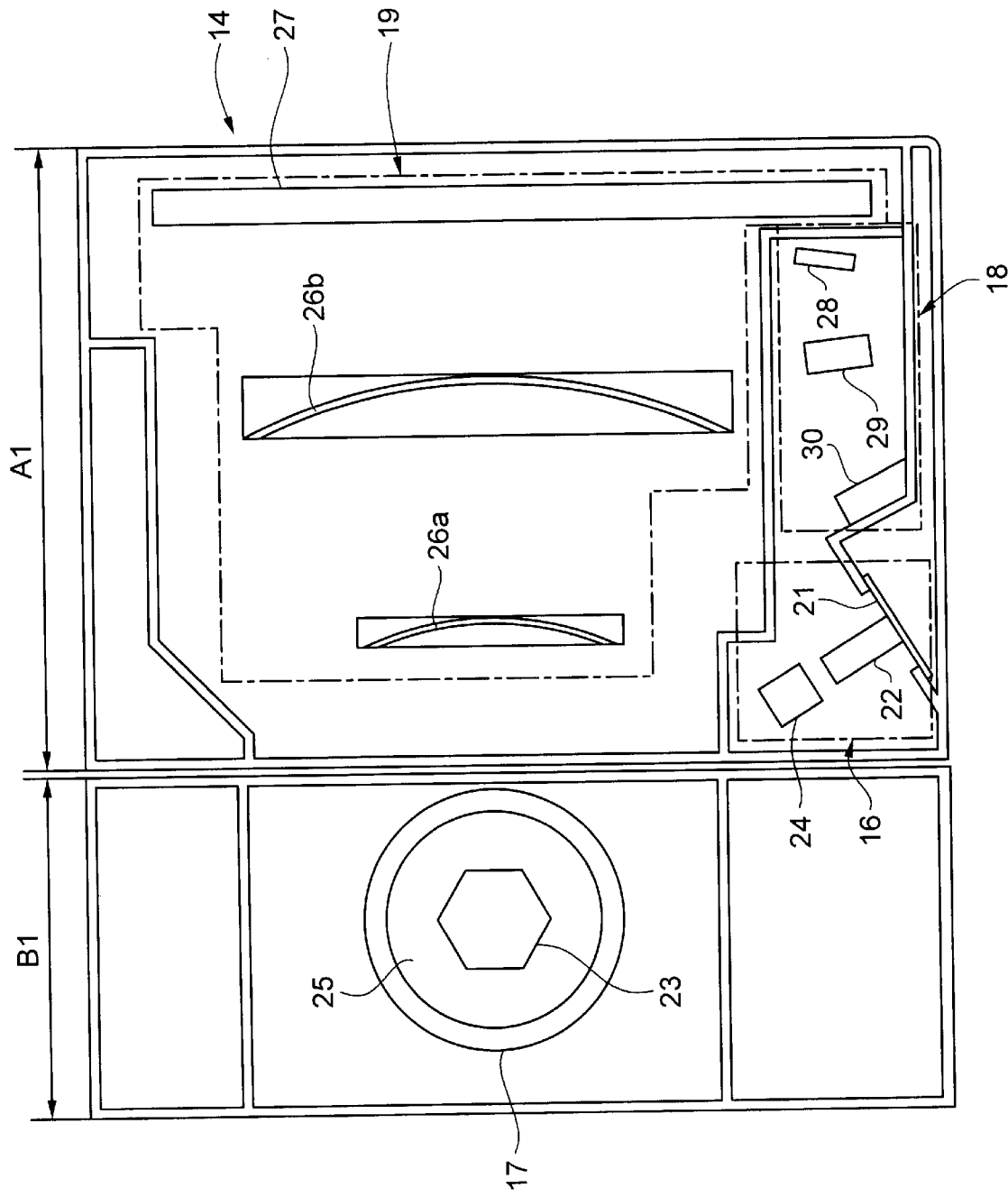
FIG. 2 is a plan view of a laser recording unit 14 of the laser recording apparatus.

The laser recording apparatus according to the present embodiment has the laser recording unit 14 thereof divided into a first unit A1 and a second unit B1, as shown in FIGS. 1 and 2, with the optical means 19, laser beam emitting means 16, and laser beam detecting means 18 provided in the first unit A1, and the laser scanning means 17 provided in the second unit B1. The first unit A1 is provided in the first main unit 50, and the second unit B1 is provided in the second main unit 51. The casing of the units A1 and B1 is partially opened in order to prevent obstructing of the laser beam optical path between the means 16 through 19. In the following description the plan view of the laser recording unit 14 will be referred to with the depth direction of the paper as the base surface, and with the side ceiling portion missing.

That is, taking maintainability into consideration, the laser recording unit 14 is divided, and the optical means 19 which takes a large space is provided in the lower first main unit 50, while the laser scanning means 17 above the conveying path being arranged in the upper second main unit 51. Thus, in the state where the second main unit 51 is opened on the fulcrum 52, the optical means 19 provided on the first main unit 50 side is exposed, so internal cleaning and adjustment of the f-θ lenses 26a and 26b and so forth can be performed easily. Further, since the laser scanning means 17 is provided on the upper second main unit 51 side, the polygon motor 25 of the laser scanning means 17 does not interfere with the conveying path in the case where the second main unit 51 is opened, space can be secured, and removal of paper such as jammed paper can be easily done.

Figure 3:
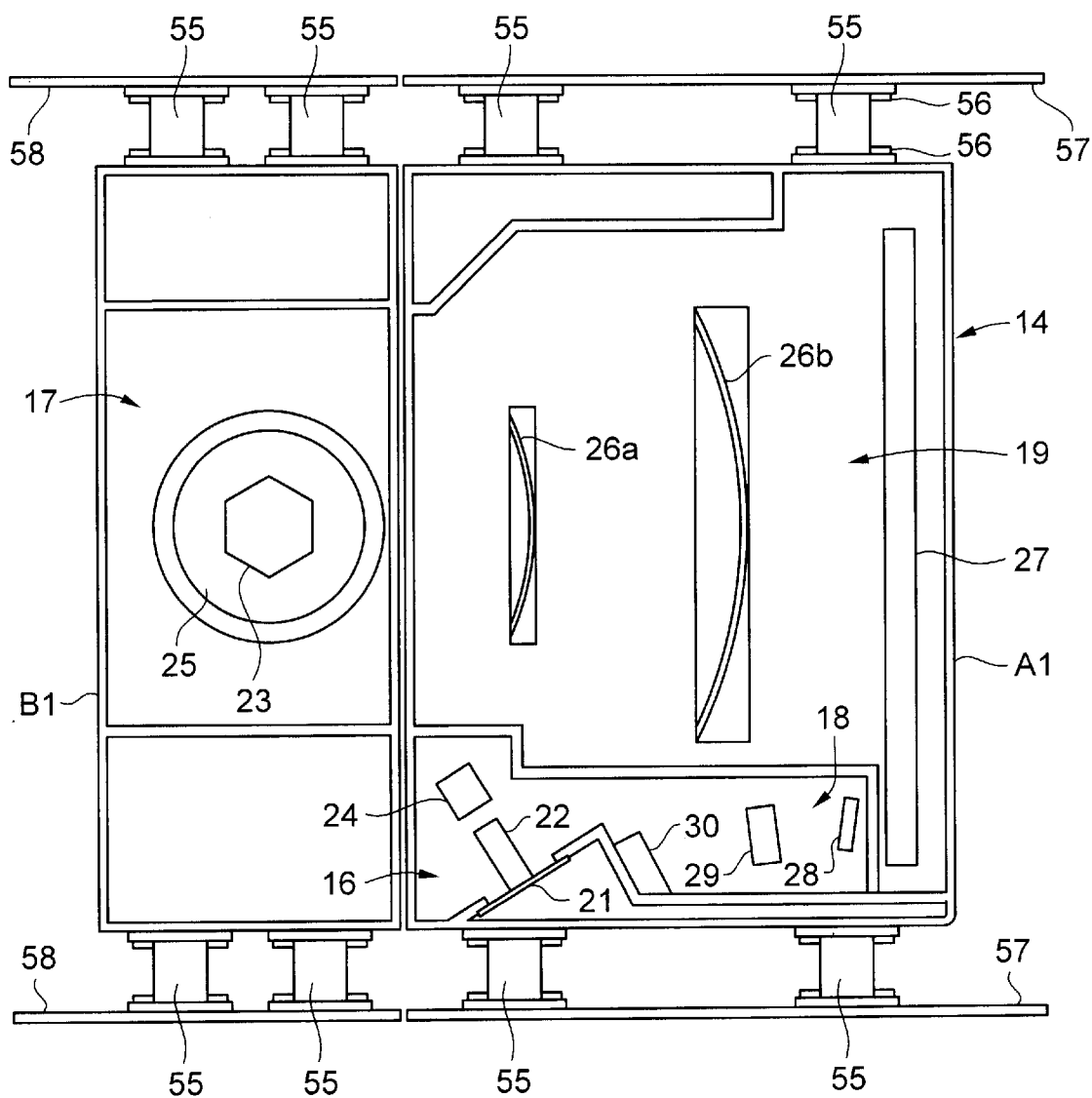
FIG. 3 is a plan view of the laser recording unit 14 supported by supporting means.

In order to lessen shock and vibrations to the laser recording unit 14, and also at times of adjusting image quality in performing setup or maintenance of the photocopier or at times of printing, the laser beam must be irradiated on the photosensitive member 1 without any positional offset. Thus, in order to fix the laser recording unit 14 to a certain position from which to irradiate the laser beam therefrom onto the photosensitive member 1, as shown in FIG. 3, the units A1 and B1 each are of a structure being supported by the main units 50 and 51 via supporting means. The supporting means is comprised of shock absorbing members 55, and positioning mechanisms for positioning the units A1 and B1 to the corresponding main units 50 and 51 when performing recording operation.

The shock absorbing member 55 is an elastic material formed of hard rubber, formed in a generally cylindrical shape, fixed on one side to the front and rear side walls of the units A1 and B1, and the other side fixed to intermediate frames 57 and 58 attached to the main units 50 and 51. Each of the units A1 and B1 are supported by a plurality of shock absorbing members 55, which function to absorb any strong shocks or vibrations applied to the photocopier so that the shocks or vibrations do not directly reach the units A1 and B1. In FIG. 3, the number of shock absorbing members 55 is four.

Incidentally, the shock absorbing members 55 are provided in the front and rear of the first and second units A1 and B1, but may be instead provided in the top and bottom or right and left of the units A1 and B1, i.e., any arrangement so that the shock absorbing members 55 contain the units A1 and B1. Also, the shock absorbing members 55 may be formed of elastic material such as springs or the like, besides hard rubber, i.e., any material may be used so long as the material has a degree of elasticity which can sufficiently absorb shock and vibration to the units A1 and B1 during the opening and closing operations of the second main unit 51, movement of the RADF 7, and operation of opening parts, and which can sufficiently maintain the position of the laser recording unit 14.

Accordingly, the shock absorbing members 55 absorb shock and vibrations from the main units 50 and 51 to the laser unit 14 in the case where the photocopier is moved, or in the case where the photocopier is subjected to external shock or vibrations, or further in the case where the second main unit 51 is opened or closed in order to deal with trouble such as paper jamming or to perform maintenance, thus reducing the shock and vibrations that the laser recording unit 14 receives.

Accordingly, such a problem which adversely affects image quality can be avoided that the f-θ lenses 26a and 26b, mirror 27, etc., which are components of the laser recording unit 14, are displaced from the proper position and as a result the irradiation point of the laser beam is shifted. Particularly, even in the case where vibration or shock is applied to the photocopier during inertial rotation of the polygon motor 25 following termination of driving thereof, damage to parts vulnerable to shock or vibration, such as the shaft rotating at high speeds and the bearings thereof, can be prevented.

Figure 4:
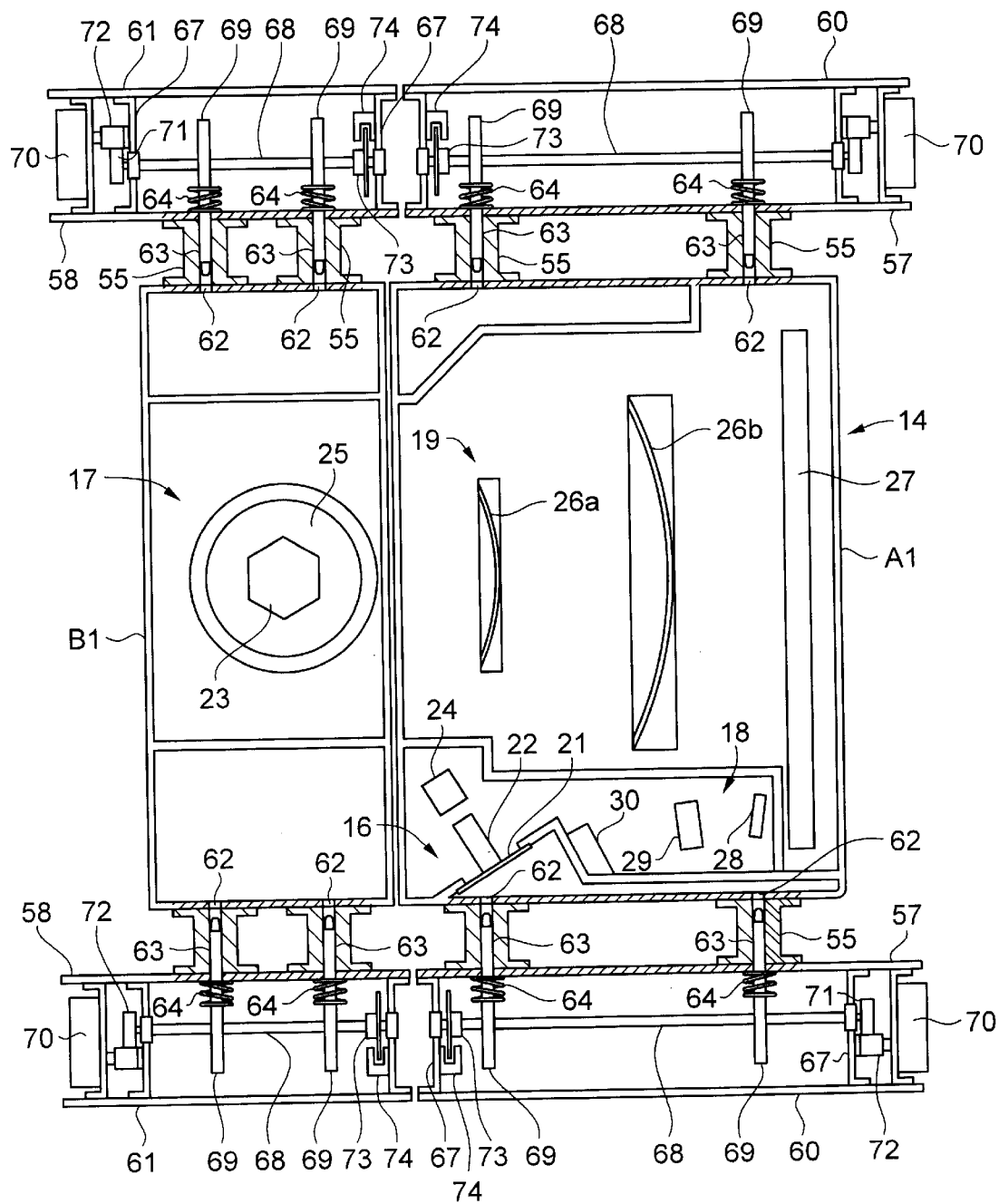
FIG. 4 is a partial cutaway view illustrating the construction of the supporting means.

The positioning mechanisms are, as shown in FIGS. 4, 5A and 5B, provided between the front and rear walls of the units A1 and B1, and the main unit frames 60 and 61 of the main units 50 and 51, and comprised of positioning shafts 63 which fit fitting holes 62 formed corresponding to the pair of shock absorbing members 55 provided on the right and left of the front and rear walls of the casing of the units A1 and B1, pressing members 64 for pressing the positioning shafts 63 in the direction away from the fitting holes, and driving units for driving the positioning shafts 63 to be inserted into the fitting holes 62 or removed therefrom.

The positioning shafts 63 are movably fitted into round through holes 65 formed in the shock absorbing members 55, having passed through the intermediate frames 57 and 58, the one end thereof being formed in a round conical shape so as to fit the fitting holes 62 and to press against the hole wall of the fitting holes 62, with flanges 66 provided at the other ends thereof. As shown in FIGS. 5A and 5B, the external diameter of the positioning shaft 63 is made to be larger than the internal diameter of the fitting hole 62.

Thus, even in the case where the laser recording unit 14 is slightly vibrating or has shifted in position due to shock or vibration, the positional offset of the units A1 and B1 is corrected by the inclined plane of the positioning shafts 63 pressing the hole walls of the fitting holes 62 in the direction opposite to the direction of offset, at the time of the one end of the positioning shafts 63 being inserted into the positioning certain position as to the respective main units 50 and 51. Also, the through holes 65 of the shock absorbing members 55 serve as guide for the motion of the positioning shafts 63, guiding the positioning shafts 63 to the fitting holes 62 in a sure manner while correcting a certain amount of warping of the positioning shafts 63.

The pressing members 64 are, for example, coil springs fit around the positioning shafts 63, and introduced between the intermediate frames 57 and 58, and the flange 66 of the positioning shafts 63.

The driving unit is comprised of: a rotational shaft 68 which is rotatably supported via bearings to an attaching plate 67 introduced between the intermediate frames 57 and 58, and the main unit frames 60 and 61; a round cam 69 which is fixed to the rotating shaft 68 and contacts the flange 66 of the positioning shafts 63; and a stepping motor 70 which rotationally drives the stepping motor 70. A gear 71 attached to one end of the rotating shaft 68 and a motor gear 72 attached to the motor shaft of the stepping motor 70 are meshed, thus transferring the rotational force of the stepping motor 70 to the rotating shaft 68. Also, the flange 66 of the positioning shaft 63 and the cam 69 are constantly in contact, owing to the pressing force of the pressing member 64.

Now, the rotating shaft 68 and the cam 69 are not concentric, but rather eccentric, and thus the positioning shaft 63 either moves in the direction of the fitting hole 62 against the force of the pressing member 64, or moves in the direction of being removed from the fitting hole 62 using the force of the pressing member 64, according to the rotation of the cam 69. That is, the mount of movement of the positioning shaft 63 can be determined by the amount of rotation of the cam 69. The driving unit and the pressing member 64 comprised inserting/removing means for inserting and removing the positioning shafts to and from the fitting holes.

Also, an encoder 73 having a plurality of slits radially arranged is attached to the other end of the rotating shaft 68, and a photo sensor 74 for detecting the rotation of the encoder 73 is fixed to the attachment plate 67. Thus, based on the number of outputs of the photo sensor 74, the amount of rotation of the rotating shaft 68, i.e., the amount of rotation of the cam 69 can be detected, and the amount of movement of the positioning shaft 63 can be detected thereby. Accordingly, positional control of the positioning shafts 63 can be performed by means of setting beforehand the number of outputs of the photo sensor 74 equivalent to the position of the positioning shafts 63 fitting the fitting holes 62 or the position of the positioning shafts 63 being removed from the fitting holes 62.

Further, at the control unit of the digital photocopier, the driving of the stepping motor 70 of the positioning means is controlled according to various conditions. This control unit has functions to control the driving of the stepping motor 70 so as to position and fix the units A1 and B1 at the time of starting recording operations, and the function to control the driving of the stepping motor 70 so as to release the fixing of the units A1 and B1 after a certain amount of time has elapsed following finishing of recording operations. Incidentally, the control unit may also be provided with functions to control the driving of the stepping motor 70 so as to position and fix the units A1 and B1 at the time of adjusting image quality during setup and maintenance.

The recording operation is started when the paper detecting sensor upstream on the transporting path outputs an on-signal on the basis of the detection of paper by the paper detecting sensor which performs the paper detection operation when an operating key for performing a recording operation (not shown) on the operating panel is operated, or in the case of a digital photocopier with facsimile-printer functions built-in, when an external signal is received. The control unit determines the start of the recording operation when the output of the on-signal is recognized by the control means. The time of ending the recording operation is defined as being a time at which the paper detecting sensor downstream on the transporting path outputs an off-signal upon detecting the paper. The control unit determines the completion of the recording operation when the output of the off-signal is recognized by the control unit. Control of the stepping motor 70 is performed by driving the stepping motor 70 until the number of times of output of the photo sensor 74 reach the set number of rotations.

In the above configuration, once the recording operation starts, the stepping motor 70 is driven, the positioning shafts 63 move in the direction of fitting the fitting holes 62 against the force of the pressing member 64 according to rotation of the rotating shaft 68 and cam 69. That is, the positioning shafts 63 switch from the state of release shown in FIG. 5B wherein the positioning shafts 63 are released from the fitting holes 62, to the state of positioning and fixing shown in FIG. 5A wherein the positioning shafts 63 are fit to the fitting holes 62 and pressed against the hole wall thereof. The units A1 and B1 are positioned and fixed to the main units 50 and 51, and the units A1 and B1 are also positioned one to another.

Then, the laser recording unit 14 and the photosensitive member 1 and so forth operate and recording operation is performed, an once paper unto which fixing has been completed is conveyed and the recording operation is ended and a certain amount of time further elapses, the stepping motor 70 rotates, and the positioning shafts 63 move in the direction of being removed from the fitting holes 62 by means of the force of the pressing member 64 according to rotation of the rotating shaft 68 and cam 69. That is, the positioning means switches from the state of positioning and fixing to the state of release, and the positioning of the units A1 and B1 to the respective main units 50 and 51 is released.

In the case that the second main unit 51 is opened or that shock is applied to the photocopier at this time, the units A1 and B1 are in a state of being elastically supported by the respective main units 50 and 51, the shock is absorbed by the shock absorbing members 55, thereby reducing the shock to the units A1 and B1, whereby the laser recording unit 14 directly receiving the effects of the shock is prevented.

Now, in the event that the second main unit 51 is not completely closed as to the first main unit 50, i.e., in the case where the locking is imperfect, performing recording operations may result in defective image quality. Accordingly, additionally providing state judging functions for judging the open/closed state of the second main unit 51 based on the state of detection of the laser beam by the laser beam detecting means 18 allows preventing of performing recording operations in the state of the main units being incompletely locked.

Figure 6A:
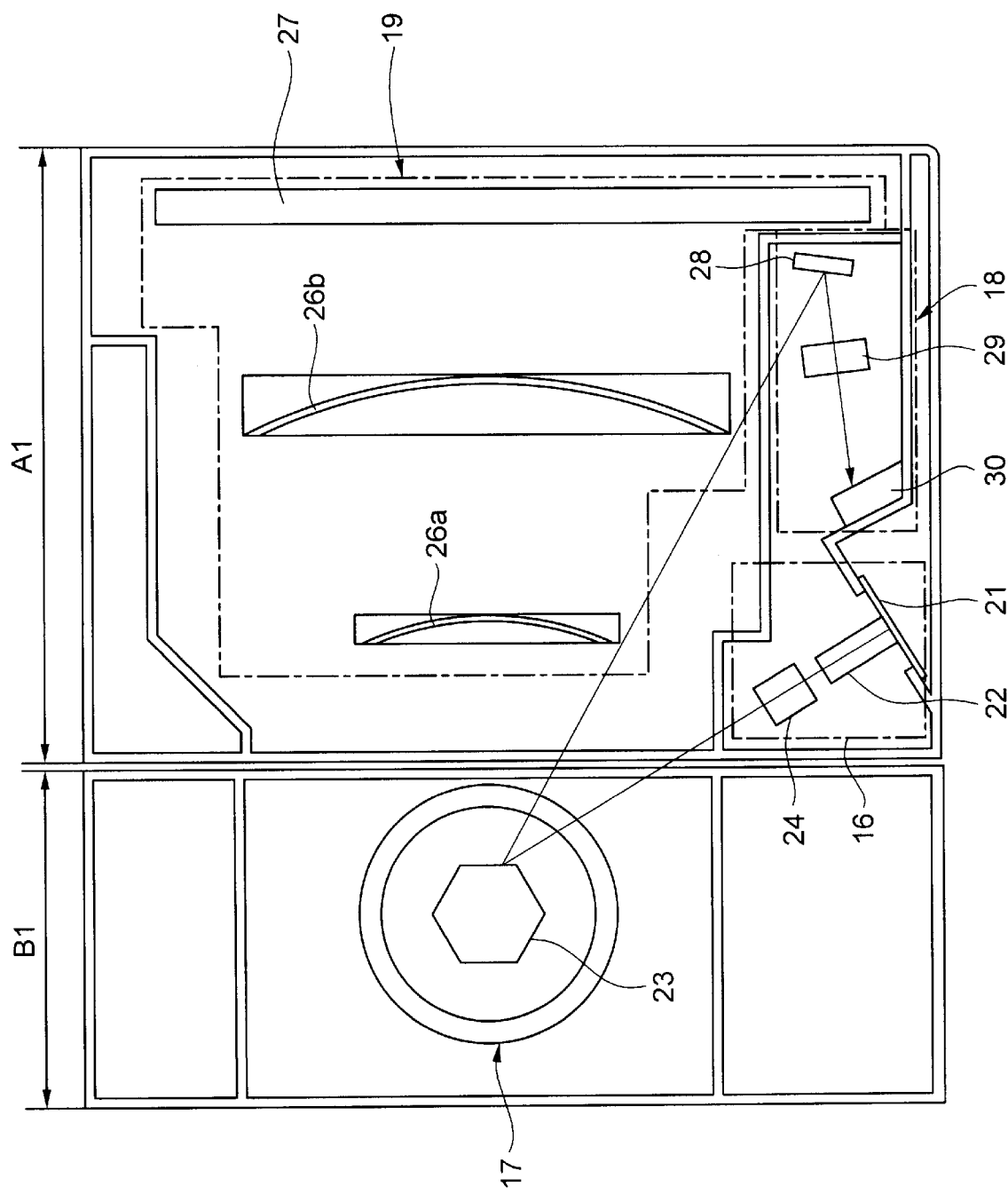
FIG. 6A is a plan view of the laser recording unit 14 completely closed.
Figure 6B:
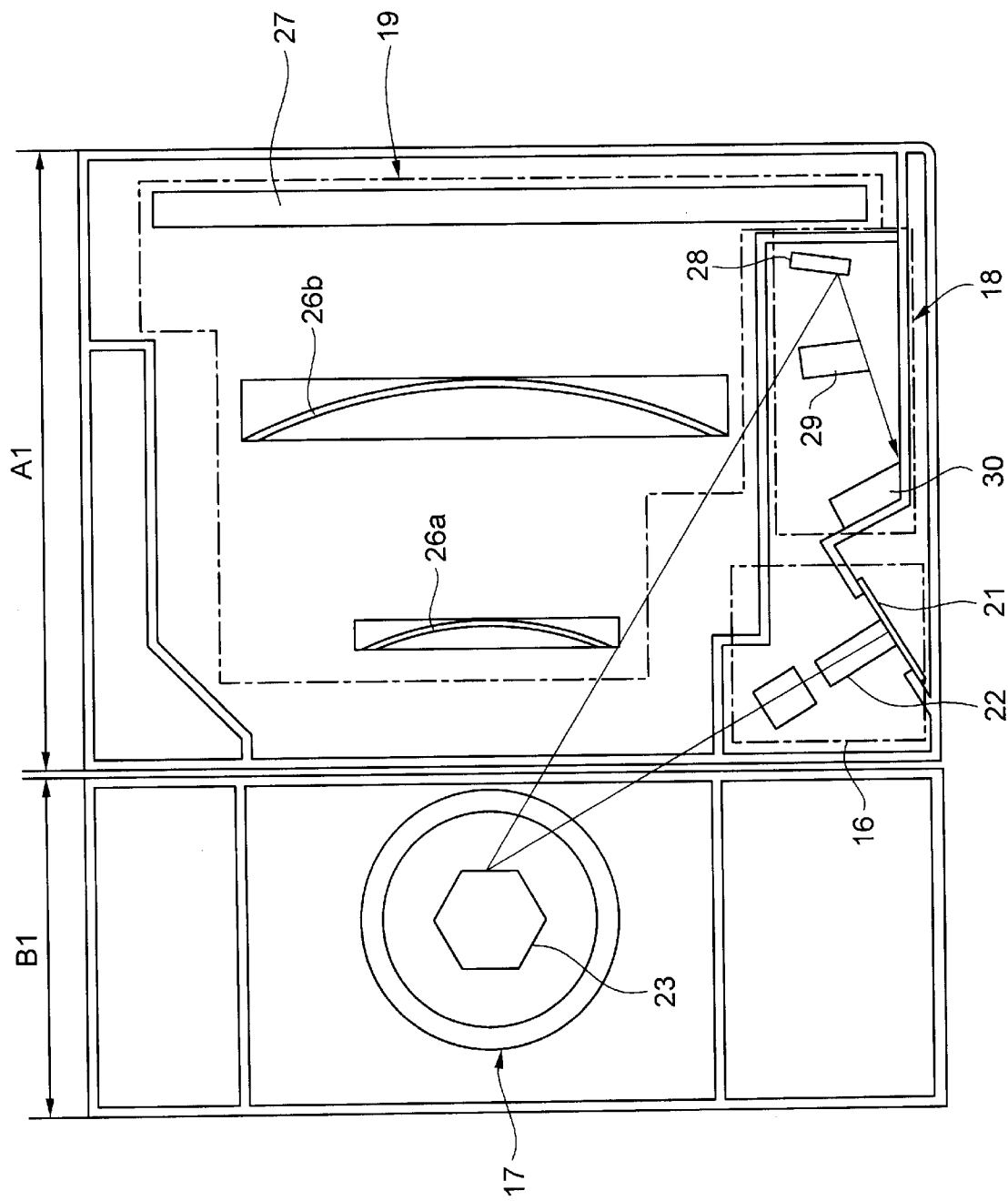
FIG. 6B is a plan view of the laser recording unit 14 incompletely closed.

In the case that the second main unit 51 is closed in a perfect state, i.e., in the case where the first and second main units 50 and 51 are in a predetermined positional relation for irradiating a laser beam on a predetermined position of the photosensitive member 1, the units A1 and B1 are positioned one to another, as shown in FIG. 6A, a portion of the laser beam reflected by the polygon mirror 23 is reflected by the BD mirror 28, passes through the BD converging lens 29, and further is detected by the BD substrate 30. The existence of a laser beam can be detected by a beam detecting signal from the BD substrate 30. In the case that the second main unit 51 is closed in an imperfect state, as shown in FIG. 6B, the units A1 and B1 are offset one to another, the surface of the polygon mirror 23 is not maintained at the predetermined relational position to the BD substrate 30, and the BD mirror 28 is not at the predetermined proper position for reflecting the laser beam reflected from the polygon mirror 23 toward the BD substrate 30. Accordingly, the BD substrate 30 does not detect the laser beam, and the beam detecting signal cannot be obtained. By means of arranging the control unit such that recording operation is enabled and irradiation of laser beam is permitted in the case where this beam detecting signal is obtained, and that recording operation is disabled and irradiation of laser beam is forbidden in the case where this beam detecting signal is not obtained, the open/closed state of the main unit can be judged by the beam detecting signal. Accordingly, the apparatus is not used in an imperfectly closed state, thus doing away with defective images, and further, detecting means such as switches for detecting the open/closed state of the apparatus are unnecessary.

Figure 7:
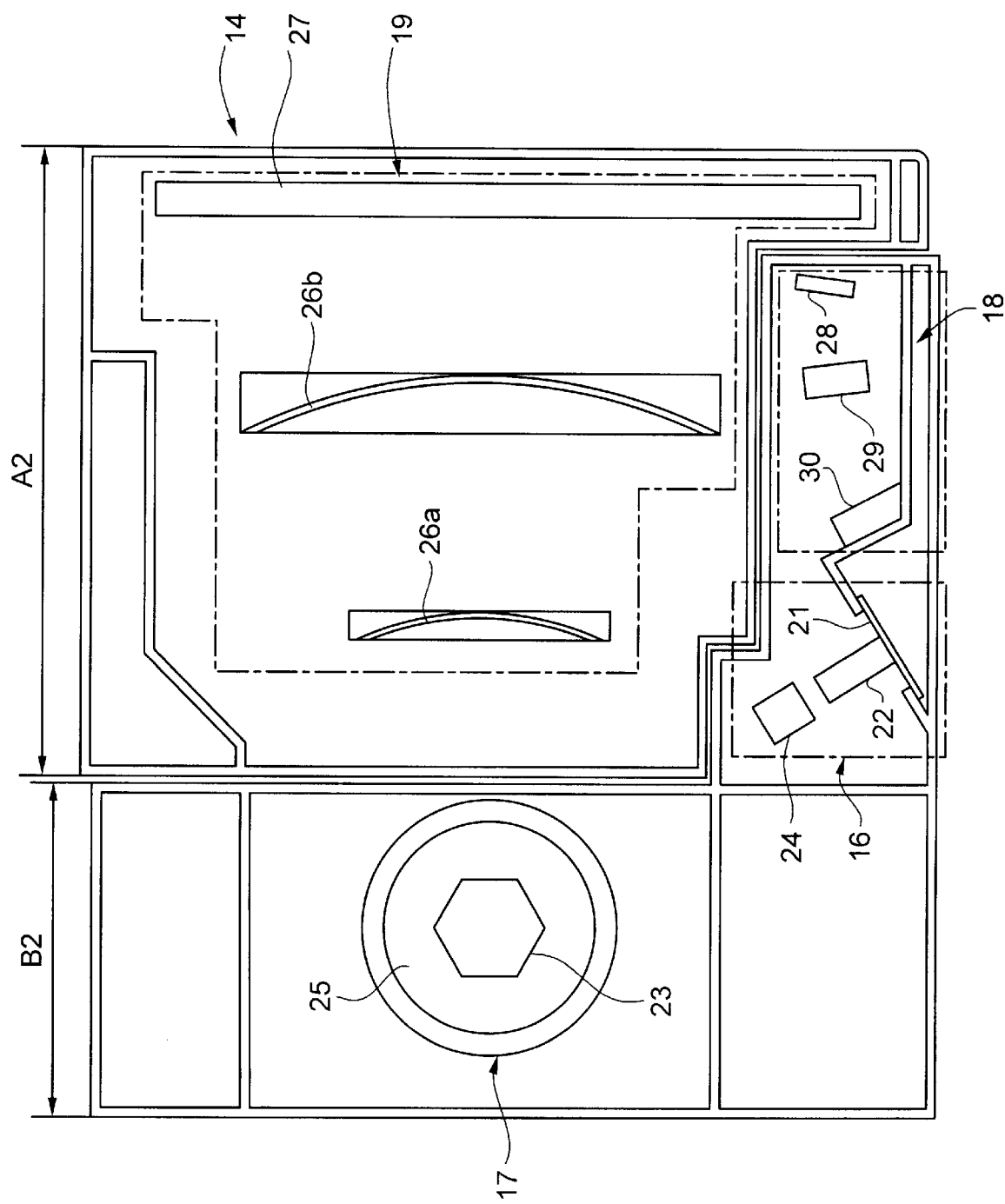
FIG. 7 is a plan view of a laser recording unit 14 of a laser recording apparatus of a second embodiment.
Figure 8:
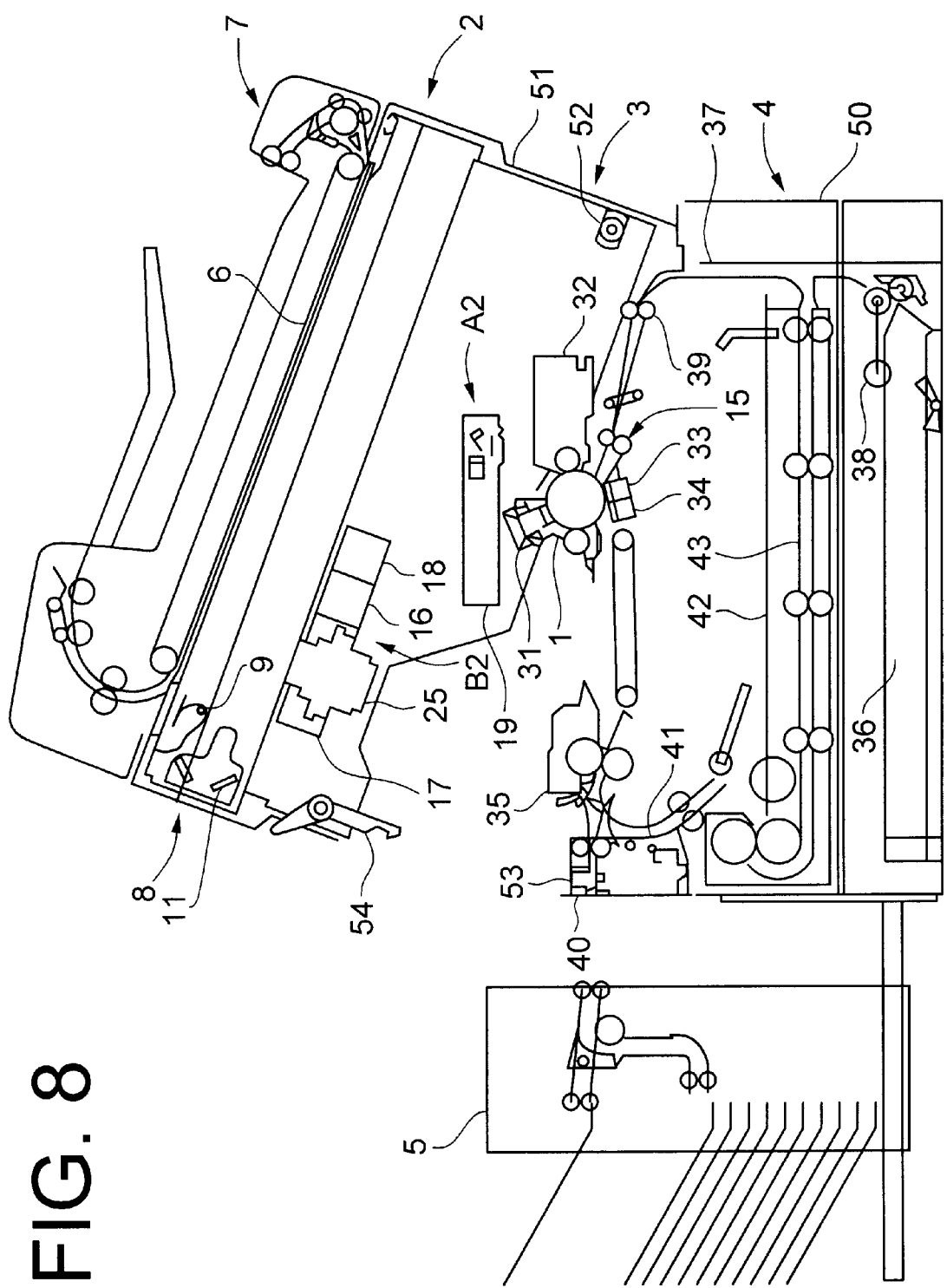
FIG. 8 is a constructional diagram illustrating the laser recording apparatus in an open state.

A laser recording apparatus according to a second embodiment of the present invention will now be described. The positioning of the parts of the laser recording apparatus according to the second embodiment are different from that of the laser recording apparatus according to the first embodiment and the rest is the same, so the parts with the same structure and actions will be provided with the same reference numerals, and description thereof will be omitted. As shown in FIGS. 7 and 8, the optical means 19 is mounted to the first unit A2 arranged in the first main unit 50, and the second unit B2 arranged in the second main unit 51 is equipped with the laser scanning means 17, laser beam emitting means 16, and laser beam detecting means 18.

The units A2 and B2 are supported by the units 50 and 51 via the supporting means. With the first unit A2, the front wall of the first unit, opposite to the main unit frame 60 is narrow, so the supporting means are provided in the side walls or top and bottom planes other than the opposing front wall. The other structures thereof are the same as those of the first embodiment.

According to this arrangement was well, as with the first embodiment, upon opening the second main unit 51 on the fulcrum 52, the optical means 19 provided in the first main unit 50 is exposed, so internal cleaning and adjustment of the f-θ lenses 26a and 26b and so forth can be performed easily. Further, since the laser scanning means 17 is provided in the second main unit 51, the polygon motor 25 of the laser scanning means 17 does not interfere with the conveying path, space can be secured, and removal of paper such as jammed paper can be easily done. Further, by means of forming the laser scanning means 17, laser beam emitting means 16, and laser beam detecting means 18 into a single unit, troublesome adjustment of the laser beam optical axis can be performed beforehand, and the trouble of performing adjustment of the optical axis again upon replacing the laser recording unit can be eliminated.

Figure 9:
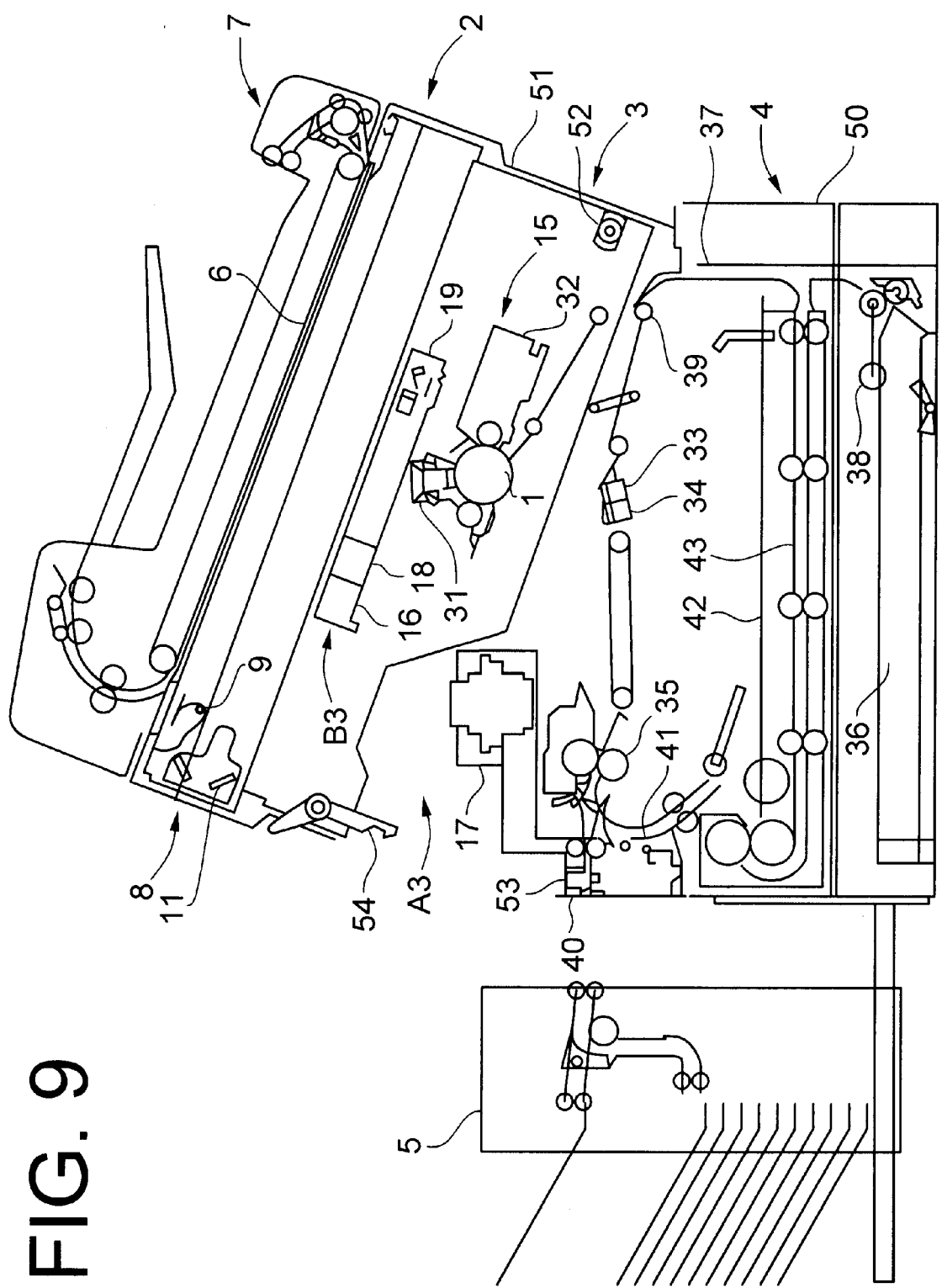
FIG. 9 is a constructional diagram illustrating a laser recording apparatus of a third embodiment in an open state.

A laser recording apparatus according to a third embodiment of the present invention will now be described. The positioning of the parts of this laser recording apparatus are different from that of the laser recording apparatus according to the first embodiment and the rest is the same, so the parts with the same structure and actions will be provided with the same reference numerals, and description thereof will be omitted. As shown in FIG. 9, according to the present embodiment, the laser scanning means 17 is mounted to the first unit A3 provided in the first main unit 50, and the optical means 19, laser beam emitting means 16, and laser beam detecting means 18 are mounted to the second unit B3 provided in the second main unit 51. Each unit A3 and B3 is supported by the respective main units 50 and 51 by means of the supporting means shown in the first embodiment. Other structures are the same as those of the first embodiment.

When opening and closing the second main unit 51, the second main unit 51 receives shock which is greater than that received by the first main unit 50. Thus, situating laser scanning means 17 with poor shock-proofing properties in the first main unit makes it harder for the laser scanning means 17 to be effected by shock, thus preventing damage to the bearings and so forth.

Figure 10:
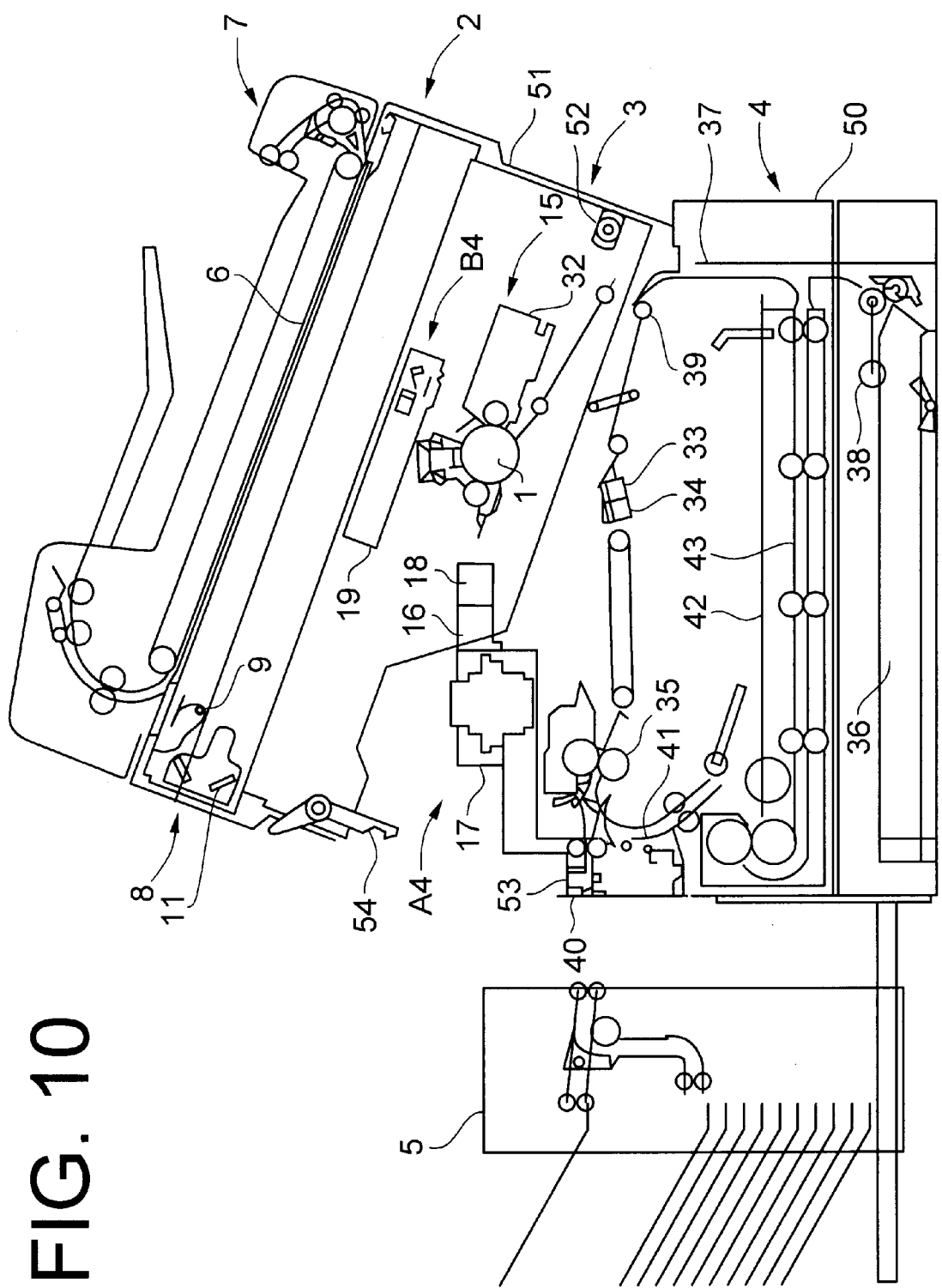
FIG. 10 is a constructional diagram illustrating another laser recording apparatus of the third embodiment in an open state.

Another example of the laser recording apparatus according to the present invention involves the following: As shown in FIG. 10, the laser scanning means 17 laser beam emitting means 16, and laser beam detecting means 18, are mounted to the first unit A4 provided in the first main unit 50, and the optical means 19 is mounted to the second unit B4 provided in the second main unit 51. Thus, the effects described here are obtained, and further, troublesome adjustment of the laser beam optical axis can be performed beforehand, and the trouble of performing adjustment of the optical axis again upon replacing the laser recording unit can be eliminated.

Figure 11:
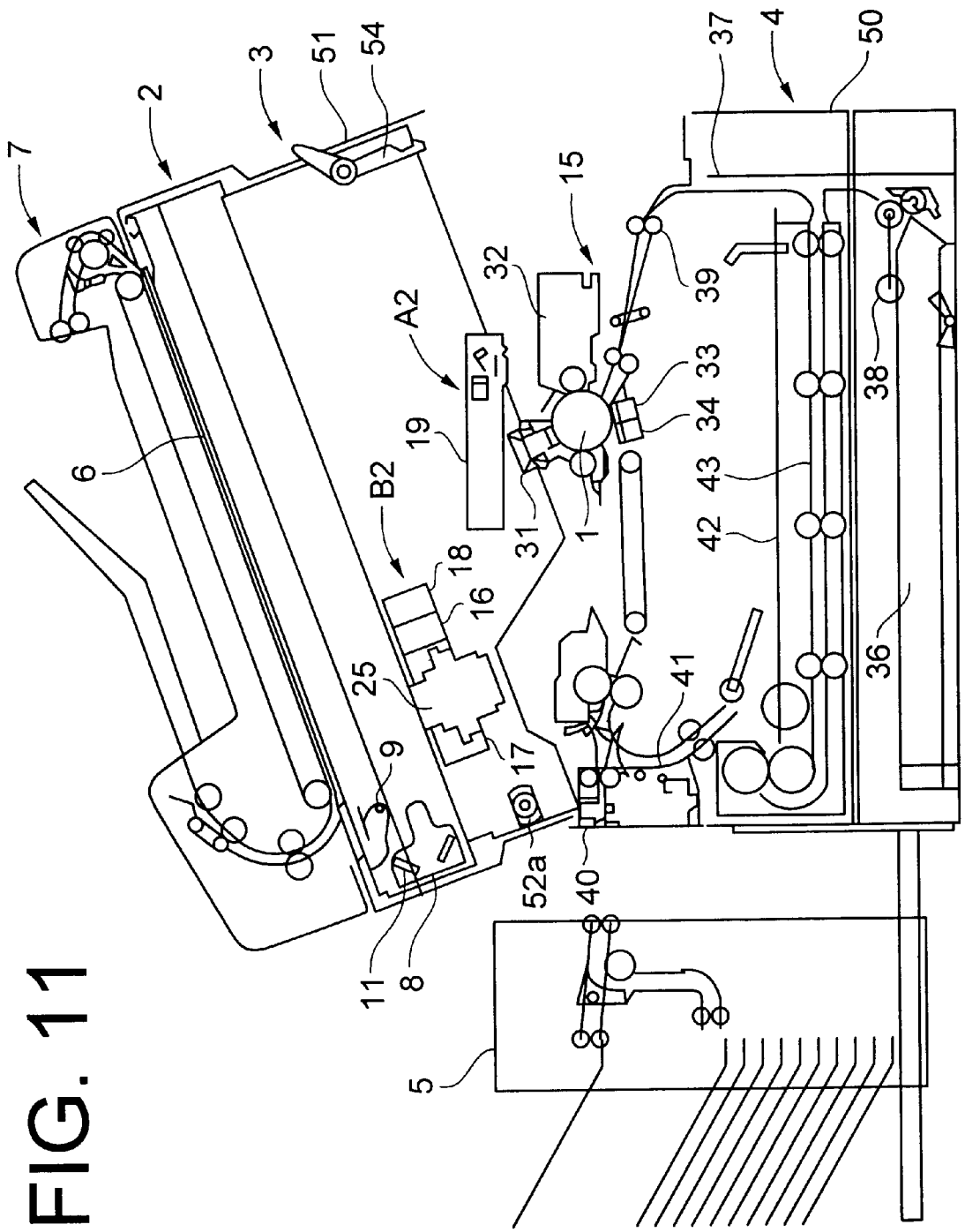
FIG. 11 is a constructional diagram illustrating the laser recording apparatus of a fourth embodiment in an open state.
Figure 12:
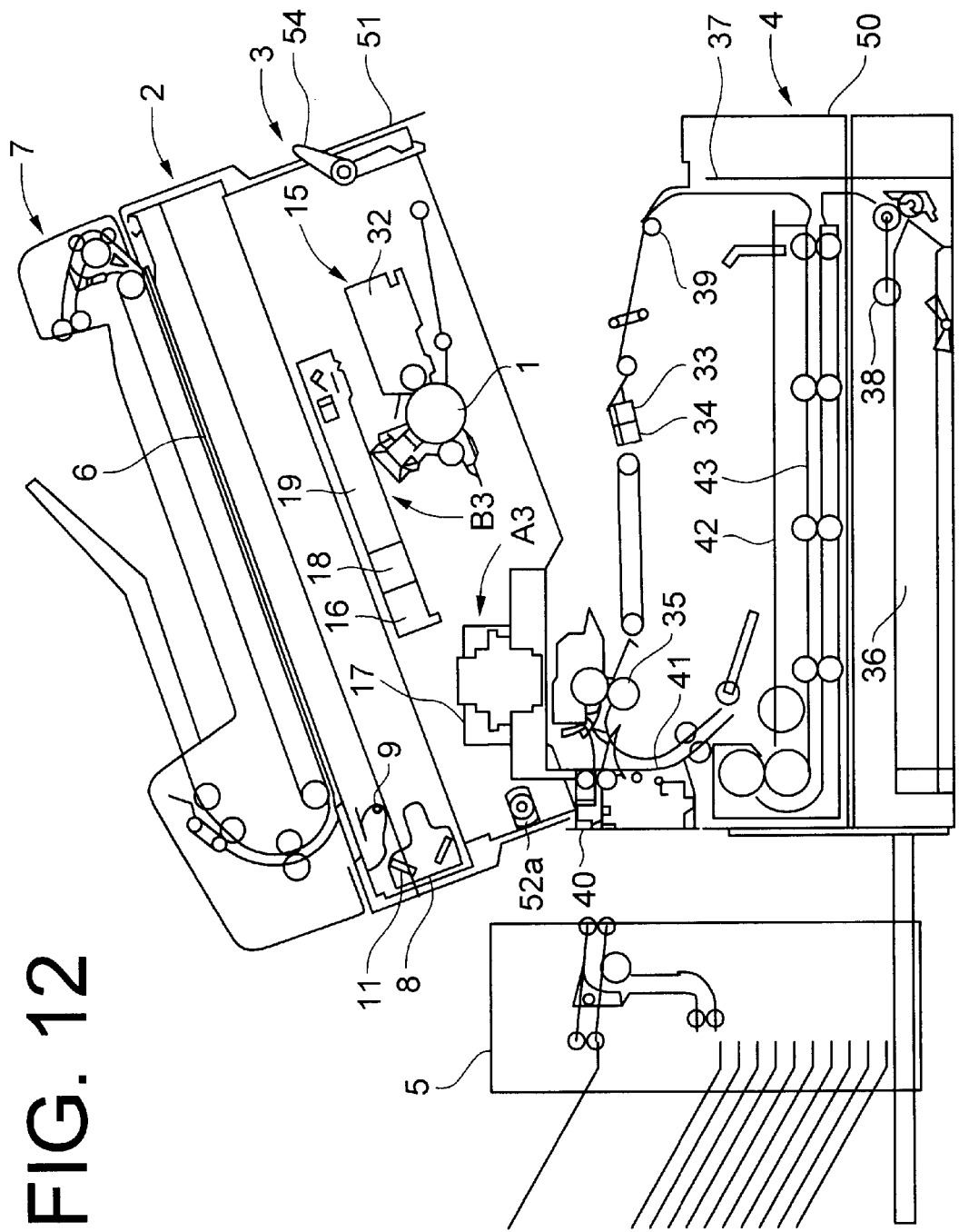
FIG. 12 is a constructional diagram illustrating another laser recording apparatus of the fourth embodiment in an open state.

A laser recording apparatus according to a fourth embodiment of the present invention will now be described. The positioning of the fulcrum of this laser recording apparatus is different from that of the laser recording apparatus according to the second embodiment and the rest is the same, so the parts with the same structure and actions will be provided with the same reference numerals, and description thereof will be omitted. As shown in FIG. 11, A fulcrum 52a for rotatably supporting the second main unit 51 is provided at one end of the first main unit 50 toward the side of the laser scanning means 17. The other structures are the same as those of the second embodiment. Also, as another example of the laser recording apparatus according to the present embodiment, the fulcrum 52a may be provided at one end near the laser scanning means 17 of the first main unit 50 as described here, in the laser recording apparatus according to the third embodiment.

In other words, the farther from the fulcrum 52, the stronger the shock is upon opening and closing, so providing the laser scanning means 17 in the proximity of the fulcrum 52 reduces the effects of shock, further improving the effects of shock absorbing.

Incidentally, it is needless to say that the present invention is by no means restricted to these embodiments, rather, a wide range of corrections and changes can be made to these embodiments within the scope of the present invention. For example, the laser recording apparatus according to the present intention is not restricted to a digital photocopier, but may be a laser beam printer or facsimile or the like having a laser recording unit, and does not even have to be of a clamshell type. Further, the present invention may be a construction comprised of the embodiments combined appropriately to absorb shock and vibrations received by the laser recording unit 14. Also, the shock absorbing means may be formed as dampers driven by hydraulics of pneumatics. Further, the driving unit for moving the positioning shafts 63 may be a solenoid instead of a cam and stepping motor.

Also, for example, the laser recording unit 14 may be divided into three parts, namely, the laser scanning means 17, the optical means 19, and the laser beam emitting means 16 and laser beam detecting means 18, thus forming three units. At this time, the following arrangement may be employed: the units having the laser scanning means 17 and the unit having the optical means 19 are separately provided in the first main unit 50 and the second main unit 51, respectively, and the unit having the laser beam emitting means 16 and laser beam detecting means 18 is provided so as to be detachable to either main units 50 or 51 by means of fitting and removing pins driven by a motor to other units, so that switching can be performed wherein the unit is engaged with the second main unit 51 in the case of processing paper jamming, and the unit is engaged with the first main unit 50 in the case of performing maintenance. Also, the supporting means may be arranged so as to support the units A1 through A4 and B1 through B4 regardless of whether or not recording operations are being performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A laser recording apparatus, comprising:
   a stationary first main unit;
   a second main unit rotatably supported to the first main unit by a professional fulcrum, so as to enable opening and closing; and
   a laser recording unit for scanning a laser beam according to a predetermined image signal and irradiating the laser beam upon a photosensitive member;
   wherein the laser beam recording unit includes emitting means for emitting a laser beam modulated according to the image signal, scanning means for scanning the laser beam emitted from the emitting means, and optical means for guiding the laser beam scanned by the scanning means onto the photosensitive member and forming an image;
   status judging means for judging status whether or not the first and second main units are in such a positional relation that the laser recording unit irradiates the laser beam in a predetermined position on the photosensitive member; and
   control means for causing the laser recording unit to irradiate the laser beam, in the case where the first and second main units are judged as being in said positional relation by the status judging means, and for causing the laser recording unit to stop, in the case where the first and second main units are judged as not being in said positional relation;
   wherein the optical means is provided in the first main unit, and the scanning means are provided in the second main unit.

2. The laser recording apparatus of claim 1, wherein the emitting means is provided in the second main unit.

3. The laser recording apparatus of claim 1, wherein the laser recording unit further comprises detecting means for detecting a portion of the laser beam scanned by the scanning means so as to manage image recording on the photosensitive member, and wherein the status judging means judges the positional relation between the first and second main units, based on whether or not the portion of the laser beam is detected by the detecting means.

4. A laser recording apparatus, comprising:
   a stationary first main unit;
   a second main unit rotatably supported to the first main unit by a professional fulcrum, so as to enable opening and closing; and
   a laser recording unit for scanning a laser beam according to a predetermined image signal and irradiating the laser beam upon a photosensitive member,
   wherein the laser beam recording unit is divided into first and second units, the first unit being provided in the first main unit and the second unit being provided in the second main unit, and
   wherein the laser recording apparatus further comprises supporting means for supporting each of the first and second units, and fixing the first and second units to predetermined reference positions, respectively, as to the first and second main units, in the case where the laser recording unit performs laser beam irradiation, and not fixing the first and second units in the case of not performing laser beam irradiation.

5. The laser recording apparatus of claim 4, wherein the supporting means further comprises:

shock absorbing means for absorbing shock and vibration to the first and second units and supporting the first and second units; and positioning means for positioning and fixing the first and second units to the reference positions in the case where the laser recording unit performs laser beam irradiation, and not fixing the first and second units in the case of not performing the laser beam irradiation.

6. The laser recording apparatus of claim 5, wherein the positioning means further comprises:

flat plate members attached to the first and second units and provided with fitting holes;

positioning shafts which are rod-shaped members, having an external diameter grater than an internal diameter of the fitting holes and one end having a round conical shape; and inserting/removing means for inserting the positioning shafts into the fitting holes of the flat plate members in the case where the first and second units are to be positioned and fixed, and removing the positioning shafts from the fitting holes of the flat plate members in the case where fixing is not performed.

7. The laser recording apparatus of claim 4, wherein the laser recording unit includes emitting means for emitting a laser beam modulated according to the image signal, scanning means for scanning the laser beam emitted from the emitting means, and optical means for guiding the laser beam scanned by the scanning means onto the photosensitive member and forming an image;

and wherein the first unit includes optical means, and the second unit includes the scanning means.

8. The laser recording apparatus of claim 7, wherein the fulcrum is provided in the proximity of the scanning means.

9. The laser recording apparatus of claim 4, wherein the laser recording unit includes emitting means for emitting a laser beam modulated according to the image signal, scanning means for scanning the laser beam emitted from the emitting means, and optical means for guiding the laser beam scanned by the scanning means onto the photosensitive member and forming an image;

and wherein the first unit includes the scanning means, and the second unit includes the optical means.

10. A laser recording apparatus, comprising:

a stationary first main unit;

a second main unit rotatably supported to the first main unit by a predetermined fulcrum, so as to enable opening and closing; and a laser recording unit for scanning a laser beam according to a predetermined image signal and irradiating the laser beam upon a photosensitive member;

wherein the laser recording unit includes emitting means for emitting a laser beam modulated according to the image signal, scanning means consisting of a polygon mirror for carrying out deflection-scanning of the laser beam emitted from the emitting means while turning the laser beam, and optical means including various kinds of optical lenses for guiding the laser beam scanned by the scanning means onto the photosensitive member and forming an image;

at least the scanning means and the optical means are separatably provided as a first unit and a second unit, respectively; and the first unit is disposed in either one of the first main unit and the second main unit and the second unit is disposed in the other one of the first main unit and the second main unit so that the first unit and the second unit are separated from each other when the first main unit and the second main unit are separated vertically.

11. The laser recording apparatus of claim 10, wherein the first unit including the scanning means is disposed in the first main unit and the second unit including the optical means is disposed in the second main unit so that the second unit is separated from the first unit by opening/closing of the second main unit.

12. The laser recording apparatus of claim 10, wherein the first unit including the scanning means is disposed in the second main unit and the second unit including the optical means is disposed in the first main unit so that the first unit is separated from the second unit by opening/closing of the second main unit.

13. The laser recording apparatus of claim 10, wherein the emitting means is provided in an integrated manner on either the first unit side or the second unit side.

* * * * *